United States Patent
Kodukula et al.

(10) Patent No.: US 12,309,380 B2
(45) Date of Patent: May 20, 2025

(54) SYSTEMS AND METHODS FOR A MULTI-RESOLUTION VISUAL SENSING ARCHITECTURE FOR AUGMENTED REALITY

(71) Applicants: Venkatesh Kodukula, Tempe, AZ (US); Alexander Shearer, Tempe, AZ (US); Van Nguyen, Madison, WI (US); Srinivas Lingutla, Chicago, IL (US); Robert LiKamWa, Tempe, AZ (US)

(72) Inventors: Venkatesh Kodukula, Tempe, AZ (US); Alexander Shearer, Tempe, AZ (US); Van Nguyen, Madison, WI (US); Srinivas Lingutla, Chicago, IL (US); Robert LiKamWa, Tempe, AZ (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 69 days.

(21) Appl. No.: 18/174,259

(22) Filed: Feb. 24, 2023

(65) Prior Publication Data

US 2023/0269377 A1    Aug. 24, 2023

Related U.S. Application Data

(60) Provisional application No. 63/313,537, filed on Feb. 24, 2022.

(51) Int. Cl.
*H04N 19/132* (2014.01)
*H04N 19/167* (2014.01)
(Continued)

(52) U.S. Cl.
CPC ......... *H04N 19/132* (2014.11); *H04N 19/167* (2014.11); *H04N 19/172* (2014.11);
(Continued)

(58) Field of Classification Search
CPC .. H04N 19/132; H04N 19/167; H04N 19/172; H04N 19/182; H04N 19/33; H04N 19/423
See application file for complete search history.

(56) References Cited

U.S. PATENT DOCUMENTS

2019/0116352 A1*  4/2019  Pesonen ............... H04N 19/132
2019/0273921 A1*  9/2019  Abe .................... H04N 19/176

OTHER PUBLICATIONS

Andrew Adams, Eino-Ville Talvala, Sung Hee Park, David E Jacobs, Boris Ajdin, Natasha Gelfand, Jennifer Dolson, Daniel Vaquero, Jongmin Baek, Marius Tico, et al. The frankencamera: an experimental platform for computational photography. In ACM SIGGRAPH. 2010.
(Continued)

*Primary Examiner* — Hesham K Abouzahra
(74) *Attorney, Agent, or Firm* — Polsinelli PC

(57) ABSTRACT

A system defining a visual sensing pipeline architecture flexibly allows application developers to dynamically adapt the spatial resolution and update rate of different "rhythmic pixel encoding regions" in a scene. The system ingests pixel streams with raster-scan pixel read-out patterns, but only encodes relevant pixels prior to storing them in memory. The system includes streaming hardware to decode the stored rhythmic pixel encoding region stream into traditional frame-based representations to feed into standard computer vision algorithms.

24 Claims, 21 Drawing Sheets

(51) Int. Cl.
H04N 19/172 (2014.01)
H04N 19/182 (2014.01)
H04N 19/33 (2014.01)
H04N 19/423 (2014.01)

(52) U.S. Cl.
CPC ........... *H04N 19/182* (2014.11); *H04N 19/33* (2014.11); *H04N 19/423* (2014.11)

(56) References Cited

OTHER PUBLICATIONS

Android. Android Camera API documentation. https://developer.android.com/ guide/topics/media/camera.
Mark Buckler, Philip Bedoukian, Suren Jayasuriya, and Adrian Sampson. Eva2: Exploiting temporal redundancy in live computer vision. In ACM/IEEE 45th Annual Int. Symp on Computer Architecture (ISCA), 2018.
Z. Cao, G. Hidalgo Martinez, T. Simon, S. Wei, and Y. A. Sheikh. Openpose: Real-time multi-person 2d pose estimation using part affinity fields. IEEE Transactions on Pattern Analysis and Machine Intelligence, 2019.
Tiffany Yu-Han Chen, Lenin Ravindranath, Shuo Deng, Paramvir Bahl, and Hari Balakrishnan. Glimpse: Continuous, real-time object recognition on mobile devices. In Proc. of the 13th ACM Conf. on Embedded Networked Sensor Systems, 2015.
Yu-Hsin Chen, Tien-Ju Yang, Joel Emer, and Vivienne Sze. Eyeriss v2: A flexible accelerator for emerging deep neural networks on mobile devices. IEEE journal on Emerging and Selected Topics in Circuits and Systems, 2019.
Jaehyuk Choi, Seokjun Park, Jihyun Cho, and Euisik Yoon. An energy/illumination-adaptive CMOS image sensor with reconfigurable modes of operations. IEEE journal of Solid-State Circuits, 2015.
Gordon Cooper, Augmenting Your Reality with Deep Learning, Synopsys. https://www.synopsys.com/designware-ip/technical-bulletin/augmenting-your-reality-dwtb_q318.html.
EETimes. Tensilica's New Vision/AI DSP Guns for SLAM. https://www.eetimes.com/tensilicas-new-vision-ai-dsp-guns-for-slam.
Yu Feng, Paul Whatmough, and Yuhao Zhu. Asv: accelerated stereo vision system. In Proc. of the 52nd Annual IEEE/ACM Int. Symp. on Microarchitecture, 2019.
Gallego, Guillermo and Delbruck, Tobi and Orchard, Garrick and Bartolozzi, Chiara and Taba, Brian and Censi, Andrea and Leutenegger, Stefan and Davison, Andrew and Conradt, Jorg and Daniilidis, Kostas and others. Event-based vision: A survey. arXiv preprint arXiv:1904.08405, 2019.
Saugata Ghose, Abdullah Giray Yaglikci, Raghav Gupta, Donghyuk Lee, Kais Kudrolli, William X Liu, Hasan Hassan, Kevin K Chang, Niladrish Chatterjee, Aditya Agrawal, Mike Connor, and Onur Mutlu. What your dram power models are not telling you: Lessons from a detailed experimental study. Proc. of the ACM on Measurement and Analysis of Computing Systems, 2018.
Ashish Gondimalla, Noah Chesnut, Mithuna Thottethodi, and TN Vijaykumar. Sparten: A sparse tensor accelerator for convolutional neural networks. In Proc. of the 52nd Annual IEEE/ACM International Symposium on Microarchitecture, 2019.
Rachel Inman, Take off to your next destination with Google Maps. https://www.blog.google/products/maps/take-your-next-destination-google-maps.
Mohit Gupta, Amit Agrawal, Ashok Veeraraghavan, and Srinivasa G Narasimhan. Flexible voxels for motion-aware videography. In European Conference on Com¬puter Vision, 2010.
Rehan Hameed, Wajahat Qadeer, Megan Wachs, Omid Azizi, Alex Solomatnikov, Benjamin C Lee, Stephen Richardson, Christos Kozyrakis, and Mark Horowitz. Understanding sources of inefficiency in general-purpose chips. In Proc. of the 37th annual intl. symp on Computer architecture, 2010.
Ron Ho, Kenneth W Mai, and Mark A Horowitz. The future of wires. Proc. of the IEEE, 2001.
Jinhan Hu, Jianan Yang, Vraj Delhivala, and Robert LiKamWa. Characterizing the reconfiguration latency of image sensor resolution on android devices. In Proc. of the 19th International Workshop on Mobile Computing Systems & Applications, 2018.
Odrika Iqbal, Saquib Siddiqui, Joshua Martin, Sameeksha Katoch, Andreas Spanias, Daniel Bliss, Suren Jayasuriya, and SenSIP Center. Design and fpga implementation of an adaptive video subsampling algorithm for energy-efficient single object tracking. In IEEE Int Conf on Image Processing, 2020.
Robert LiKamWa, Bodhi Priyantha, Matthai Philipose, Lin Zhong, and Paramvir Bahl. Energy characterization and optimization of image sensing toward continuous mobile vision. In Proc. of the 11th annual international conference on Mobile systems, applications, and services, 2013.
Chaochao Lu, Michael Hirsch, and Bernhard Scholkopf. Flexible spatio-temporal networks for video prediction. In Proc. of the IEEE Conf. on Computer Vision and Pattern Recognition, 2017.
Nir Magen, Avinoam Kolodny, Uri Weiser, and Nachum Shamir. Interconnect-power dissipation in a microprocessor. In Proc. of the 2004 international workshop on System level interconnect prediction, 2004.
Krishna T Malladi, Frank A Nothaft, Karthika Periyathambi, Benjamin C Lee, Christos Kozyrakis, and Mark Horowitz. Towards energy-proportional datacenter memory with mobile dram. In 39th Annual Int. Symp. on Computer Architecture (ISCA). IEEE, 2012.
Max Planck Institute for Informatics, University of Bonn. PoseTrack Dataset and Benchmark. https://posetrack.net/.
James D Meindl, Jeffrey A Davis, Payman Zarkesh-Ha, Chirag S Patel, Kevin P Martin, and Paul A Kohl. Interconnect opportunities for gigascale integration. IBM journal of research and development, 2002.
Micron technologies. Micron system power calculators. https://www.micron.com/support/tools-and-utilities/power-calc.
MIPI Alliance. MIPI Camera Serial Interface 2 (MIPI CSI-2). https://www.mipi.org/specifications/csi-2.
Mur-Artal, Rail, Montiel, J. M. M. and Tard6s, Juan D. ORB-SLAM: a versatile and accurate monocular SLAM system. IEEE Trans. on Robotics, 2015.
Saman Naderiparizi, Pengyu Zhang, Matthai Philipose, Bodhi Priyantha, Jie Liu, and Deepak Ganesan. Glimpse: A programmable early-discard camera architecture for continuous mobile vision. In Proc. of the 15th Annual Int. Conf. on Mobile Systems, Applications, and Services, 2017.
NICTA. ChokePoint Dataset. http://arma.sourceforge.net/chokepoint/.
OpenCV. OpenCV KeyPoint Class Reference. https://docs.opencv.org/3.4/d2/d29/classcv_1_1KeyPoint.html.
Dhinakaran Pandiyan and Carole-Jean Wu. Quantifying the energy cost of data movement for emerging smart phone workloads on mobile platforms. In 2014 IEEE Int. Syump. on Workload Characterization (IISWC). IEEE, 2014.
Vijay Raghunathan, Mani B Srivastava, and Rajesh K Gupta. A survey of techniques for energy efficient on-chip communication. In ACM Proc. of the 40th annual Design Automation Conference, 2003.
Dikpal Reddy, Ashok Veeraraghavan, and Rama Chellappa. P2c2: Programmable pixel compressive camera for high speed imaging. In CVPR 2011.
Stemmer Imaging. Teledyne DALSA Piranha4—Dual-Line-CMOS line camera. https://www.stemmer-imaging.com/en/products/series/teledyne-dalsa-piranha4.
J. Sturm, N. Engelhard, F. Endres, W. Burgard, and D. Cremers. A benchmark for the evaluation of rgb-d slam systems. In Proc. of the International Conference on Intelligent Robot Systems (IROS), 2012.
Thomas Vogelsang. Understanding the energy consumption of dynamic random access memories. In 43rd Annual IEEE/ACM Int Symp. on Microarchitecture. IEEE, 2010.
Wikipedia. Foveated Rendering. https://en.wikipedia.org/wiki/Foveated_rendering.
Xilinx. H.264/H.265 Video Codec Unit v1.2. https://www.xilinx.com/support/documentation/ip_documentation/vcu/v1_2/pg252-vcu.pdf.

(56) References Cited

OTHER PUBLICATIONS

Xilinx. Vivado Design Suite. https://www.xilinx.com/products/design-tools/ vivado.html.
Xilinx. Zynq DPU v3.2. https://www.xilinx.com/support/documentation/ip_ documentation/dpu/v3_2/pg338-dpu.pdf.
Ximea. Multiple ROI cameras. https://www.ximea.com/support/wiki/allprod/ Multiple_ROI.
Zhekai Zhang, Hanrui Wang, Song Han, and William J Dally. Sparch: Efficient architecture for sparse matrix multiplication. In 2020 IEEE Int. Symp. on High Performance Computer Architecture (HPCA), 2020.
Yuhao Zhu, Anand Samajdar, Matthew Mattina, and Paul Whatmough. Euphrates: Algorithm-soc co-design for low-power mobile continuous vision. ISCA, 2018.
Microsoft. Azure Kinect DK. https://www.microsoft.com/en-us/p/azure-kinect-dk/8pp5vxmd9nhq?activetab=pivot%3aoverviewtab.

\* cited by examiner

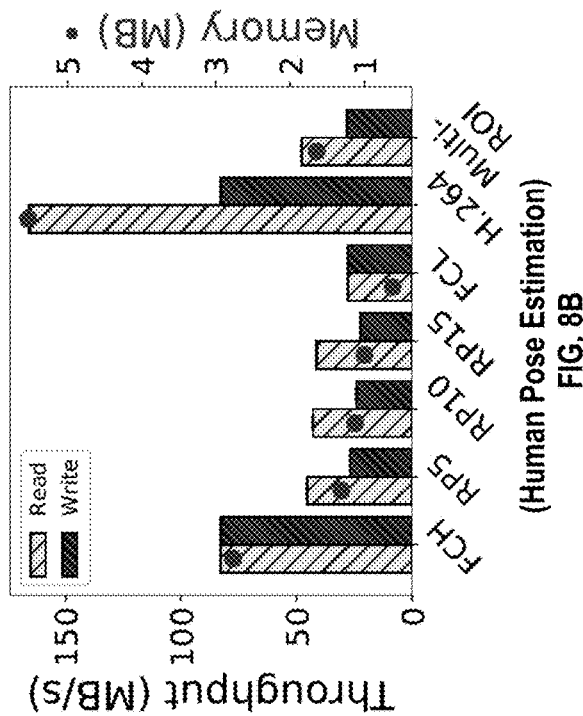
FIG. 8B (Human Pose Estimation)
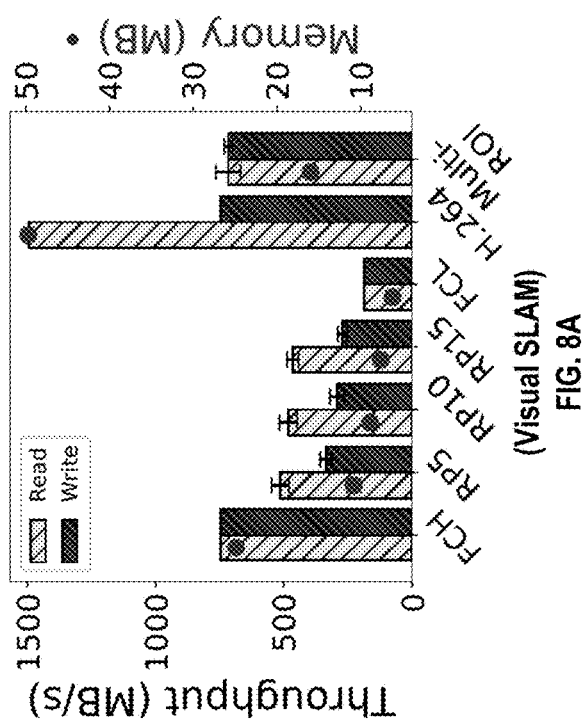
FIG. 8A (Visual SLAM)
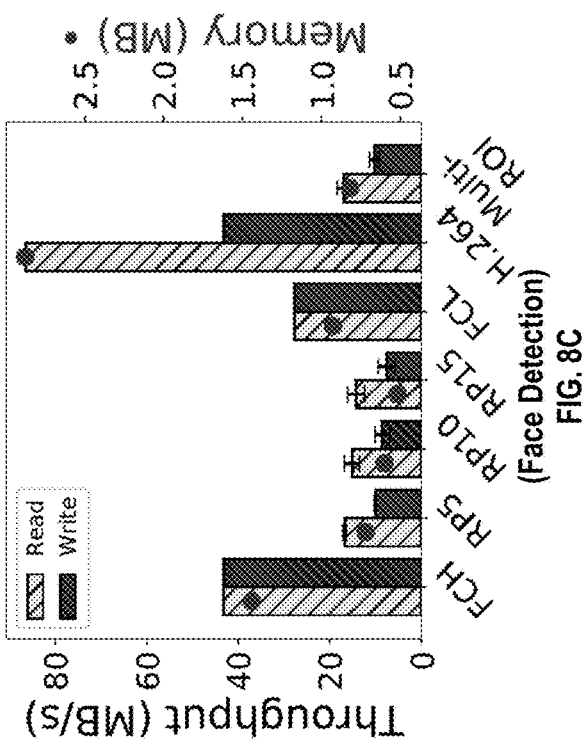
FIG. 8C (Face Detection)
FCH: Frame-based with high res.
[(a) 4K, (b) 720p, (c) SVGA]
FCL: Frame-based with low res.
[(a) 480p, (b) 240p, (c) 240p]
RPx: Rhythmic pixel regions with a cycle length of x
H.264: MPEG-4 compression
Multi-ROI: ≤ 16 regions

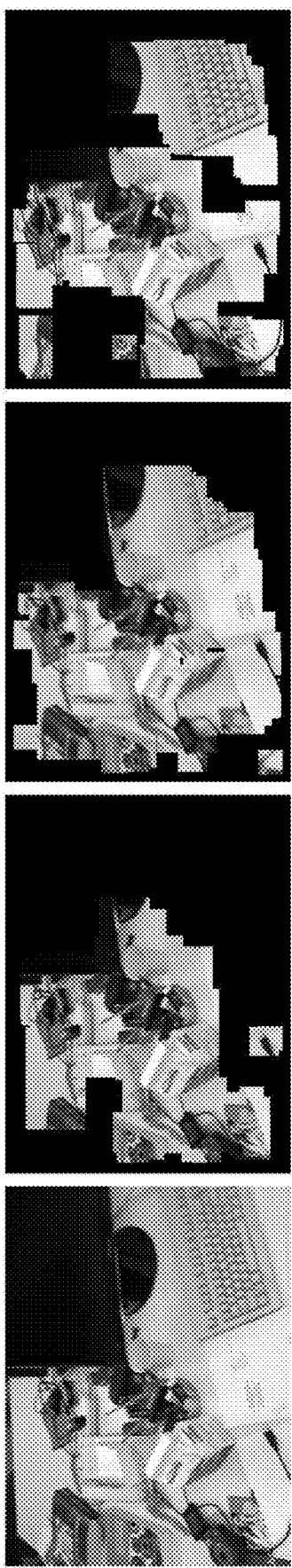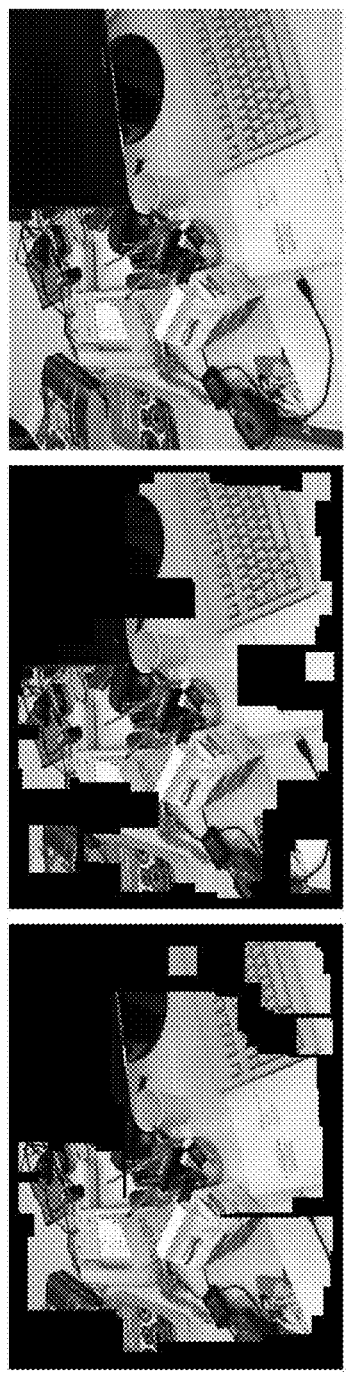
FIG. 10A (a) Frame 1 (100%)
FIG. 10B (b) Frame 2 (37%)
FIG. 10C (c) Frame 3 (31%)
FIG. 10D (d) Frame 4 (34%)
FIG. 10E (e) Frame 5 (27%)
FIG. 10F (f) Frame 6 (35%)
FIG. 10G (g) Frame 7 (100%)

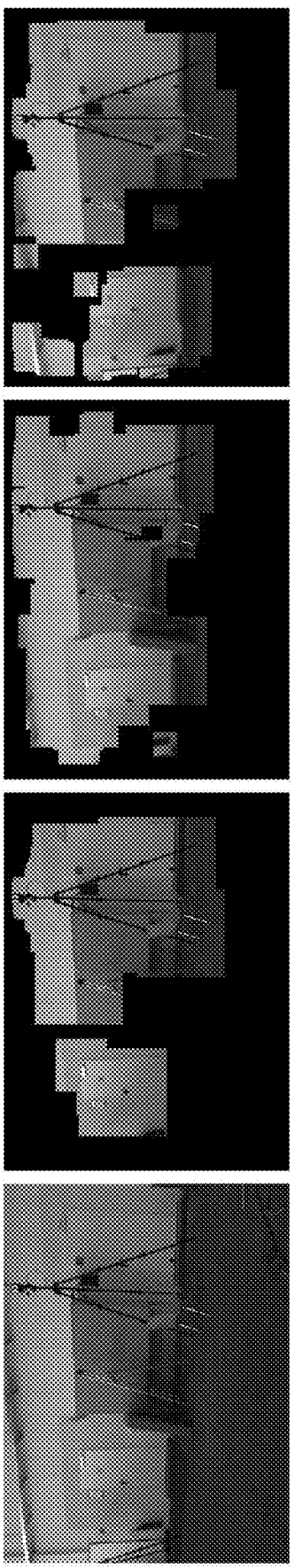
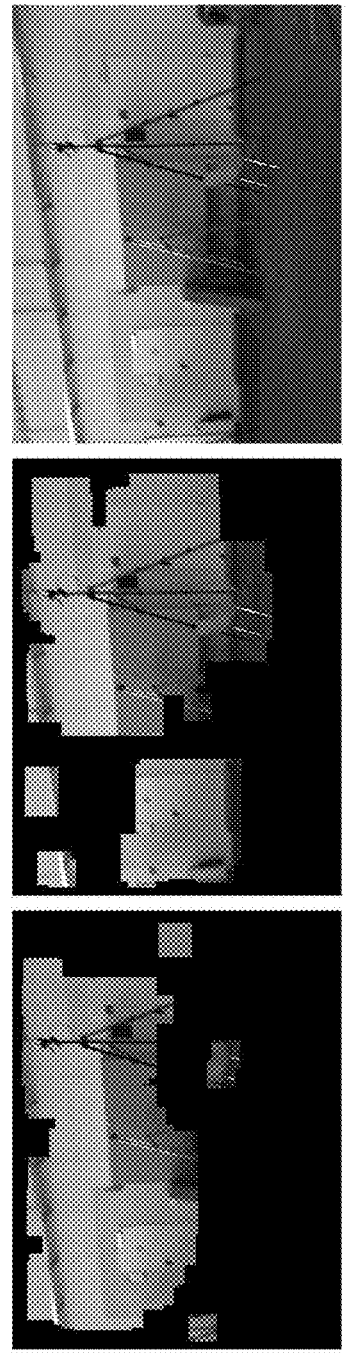
FIG. 11A (a) Frame 1 (100%)
FIG. 11B (b) Frame 2 (42%)
FIG. 11C (c) Frame 3 (36%)
FIG. 11D (d) Frame 4 (39%)
FIG. 11E (e) Frame 5 (33%)
FIG. 11F (f) Frame 6 (40%)
FIG. 11G (g) Frame 7 (100%)

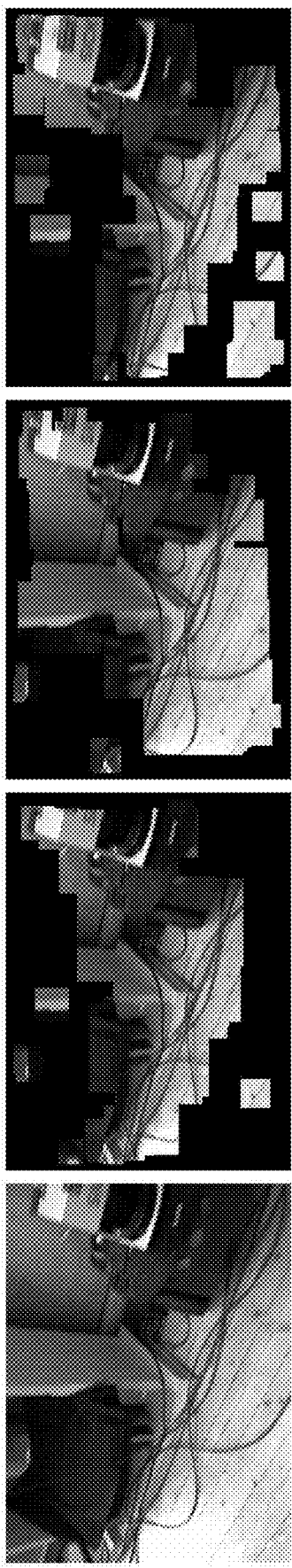
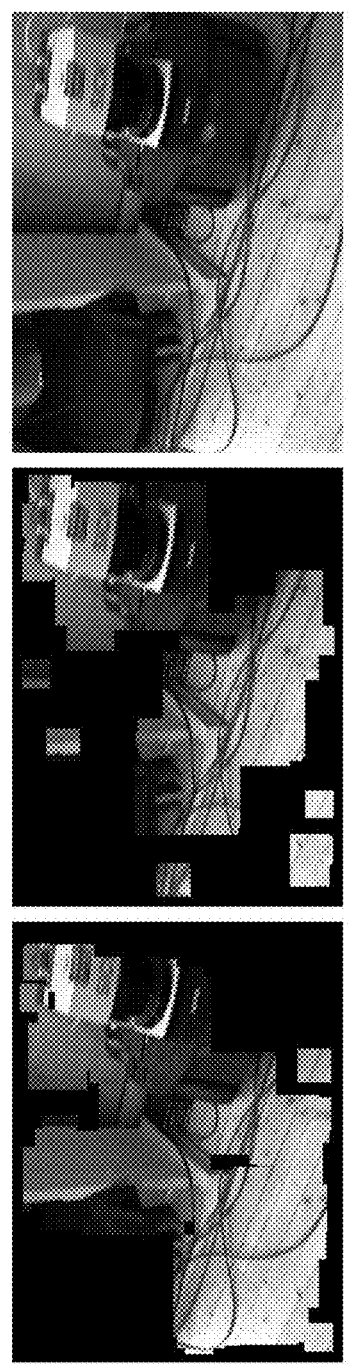
(a) Frame 1 (100%)    (b) Frame 2 (44%)    (c) Frame 3 (41%)    (d) Frame 4 (37%)    (e) Frame 5 (32%)    (f) Frame 6 (35%)    (g) Frame 7 (100%)
FIG. 12A    FIG. 12B    FIG. 12C    FIG. 12D    FIG. 12E    FIG. 12F    FIG. 12G

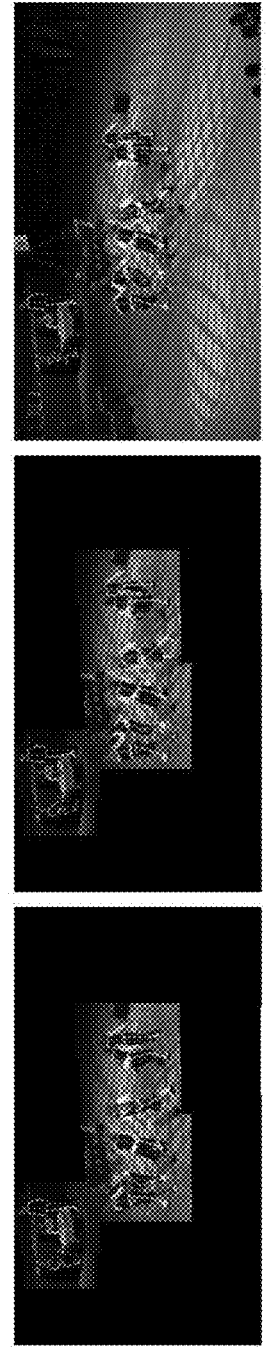
(a) Frame 1 (100%)  FIG. 13A
(b) Frame 2 (31%)  FIG. 13B
(c) Frame 3 (24%)  FIG. 13C
(d) Frame 4 (29%)  FIG. 13D
(e) Frame 5 (23%)  FIG. 13E
(f) Frame 6 (33%)  FIG. 13F
(g) Frame 7 (100%)  FIG. 13G

(a) Frame 1 (100%)  FIG. 14A
(b) Frame 2 (39%)  FIG. 14B
(c) Frame 3 (23%)  FIG. 14C
(d) Frame 4 (36%)  FIG. 14D
(e) Frame 5 (21%)  FIG. 14E
(f) Frame 6 (41%)  FIG. 14F
(g) Frame 7 (100%)  FIG. 14G

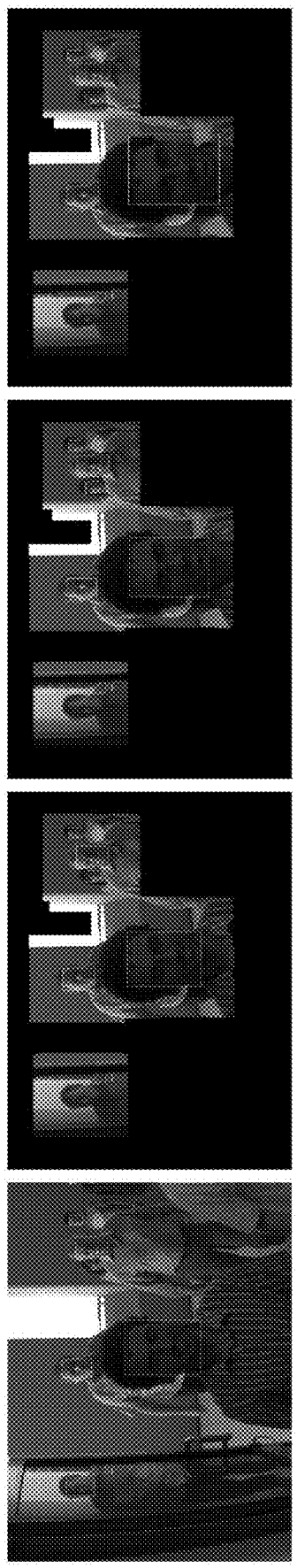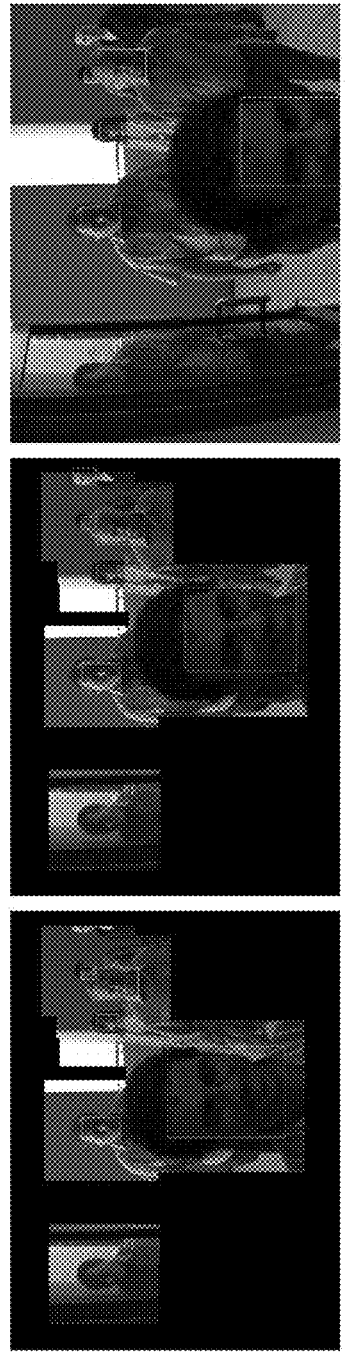
(a) Frame 1 (100%)
FIG. 15A
(b) Frame 2 (28%)
FIG. 15B
(c) Frame 3 (26%)
FIG. 15C
(d) Frame 4 (22%)
FIG. 15D
(e) Frame 5 (37%)
FIG. 15E
(f) Frame 6 (31%)
FIG. 15F
(g) Frame 7 (100%)
FIG. 15G

```
                                                            ┌─ 400 (CONT'D)
406 ┌─────────────────────────────────────────────────────────┐
    │ GENERATE, BY THE ENCODER, AN ENCODED FRAME HAVING A PLURALITY OF │
    │ REGIONAL PIXELS FROM THE FRAME AND BASED ON A SET OF ENCODING │
    │ REGION LABELS, THE SET OF ENCODING REGION LABELS DEFINING ONE OR │
    │ MORE ENCODING REGIONS, A STRIDE RESOLUTION, AND A SKIP RATE AND │
    │ THE PLURALITY OF REGIONAL PIXELS INCLUDING A SUBSET OF THE │
    │ PLURALITY OF PIXELS THAT FALL WITHIN THE ONE OR MORE ENCODING │
    │ REGIONS                              (A)                  │
```

414: OMIT, BASED ON THE COMPARISON, ONE OR MORE NON-REGIONAL PIXELS OF THE FRAME THAT DO NOT FALL WITHIN THE ENCODING REGION FROM THE ENCODED FRAME

416: OMIT, BASED ON THE COMPARISON, ONE OR MORE STRIDED PIXELS OF THE FRAME FROM THE ENCODED FRAME BASED ON THE STRIDE RESOLUTION DEFINED WITHIN THE SET OF ENCODING REGION LABELS

418: OMIT, BASED ON THE COMPARISON, ONE OR MORE SKIPPED PIXELS OF THE FRAME FROM THE ENCODED FRAME BASED ON THE SKIP RATE DEFINED WITHIN THE SET OF ENCODING REGION LABELS

420: WRITE THE ENCODED FRAME TO A MEMORY PRESERVING RASTER-SCAN ORDER

422: WRITE A SET OF ENCODING METADATA ASSOCIATED WITH THE ENCODED FRAME TO THE MEMORY, THE SET OF ENCODING METADATA INCLUDING AN ENCODING MASK AND A PER-ROW OFFSET

424: GENERATING, BASED ON THE COMPARISON, THE ENCODING MASK INDICATING POSITIONS OF THE ONE OR MORE REGIONAL PIXELS, THE ONE OR MORE SKIPPED PIXELS, THE ONE OR MORE STRIDED PIXELS, AND THE ONE OR MORE NON-REGIONAL PIXELS

426: INCREMENT, FOR EACH REGIONAL PIXEL WITHIN A ROW OF THE ENCODED FRAME, THE PER-ROW OFFSET INDICATIVE OF A TOTAL QUANTITY OF REGIONAL PIXELS WITHIN THE ROW (B)

FIG. 17B

SYSTEMS AND METHODS FOR A MULTI-RESOLUTION VISUAL SENSING ARCHITECTURE FOR AUGMENTED REALITY

CROSS-REFERENCE TO RELATED APPLICATIONS

This U.S. Non-Provisional Patent Application that claims benefit to U.S. Provisional Patent Application Ser. No. 63/313,537 filed 24 Feb. 2022, which is herein incorporated by reference in its entirety.

GOVERNMENT SUPPORT

This invention was made with government support under 1909663 and 1942844 awarded by the National Science Foundation. The government has certain rights in the invention.

FIELD

The present disclosure generally relates to visual sensing processes, and in particular, to a system and associated method for rhythmic video capture where different encoding regions are captured at different spatiotemporal resolutions.

BACKGROUND

Through the lens of their cameras, mobile devices can visually observe a user's environment for detecting faces, understanding spatial scene geometry, and capturing images and videos. This has yielded a wide range of benefits, especially as image sensors have grown to support increasingly higher resolutions and frame rates. With such precision, it is now possible to position augmented reality (AR) overlays over users' faces or spatial living environments for social entertainment. Virtual AR media can also annotate physical environmental surfaces, including for navigational guidance for walking directions. Wirelessly connected camera devices on the Internet-of-Things can provide home security, such as through video doorbells.

Unfortunately, visual systems on mobile systems are limited in their spatial precision, computational performance, and energy efficiency while performing continuous visual tasks. Mobile systems are constrained by their small form factors with limited battery sizes and heat management requirements. To reduce the power consumption, recently proposed systems reduce the spatial resolution and frame rate of image capture to receive commensurate energy savings, especially by reducing the memory traffic of dynamic random access memory (DRAM)-based frame buffers. Thus, resolution provides a tradeoff mechanism to dynamically configure systems for low power consumption or high visual task fidelity. However, downscaling or windowing a frame forces the application to reduce the resolution of the entire frame. Reducing the frame rate similarly reduces the temporal resolution of the entire frame stream. This reduced spatiotemporal resolution across the entire frame stream can lead to suboptimal visual precision.

It is with these observations in mind, among others, that various aspects of the present disclosure were conceived and developed.

BRIEF DESCRIPTION OF THE DRAWINGS

FIGS. 8A-8C are a series of graphical representations showing pixel memory traffic for Visual SLAM, human pose estimation and face detection; it was found that rhythmic pixel encoding regions reduce pixel memory traffic by generating sparser pixel streams and reduces the memory footprint by generating smaller frame buffers;

FIGS. 10A-10G are a series of graphical representations showing progression of frames for a first Visual SLAM task;

FIGS. 11A-11G are a series of graphical representations showing progression of frames for a second Visual SLAM task;

FIGS. 12A-12G are a series of graphical representations showing progression of frames for a third Visual SLAM task;

FIGS. 13A-13G are a series of graphical representations showing progression of frames for a first human pose estimation task;

FIGS. 14A-14G are a series of graphical representations showing progression of frames for a second human pose estimation task;

FIGS. 15A-15G are a series of graphical representations showing progression of frames for a face recognition task;

FIGS. 17A-17D are a series of simplified process flows showing a method for encoding and decoding frames by the system of FIGS. 2A, 2B, 4-6, and 16.

Corresponding reference characters indicate corresponding elements among the view of the drawings. The headings used in the figures do not limit the scope of the claims.

DETAILED DESCRIPTION

Figure 1A:
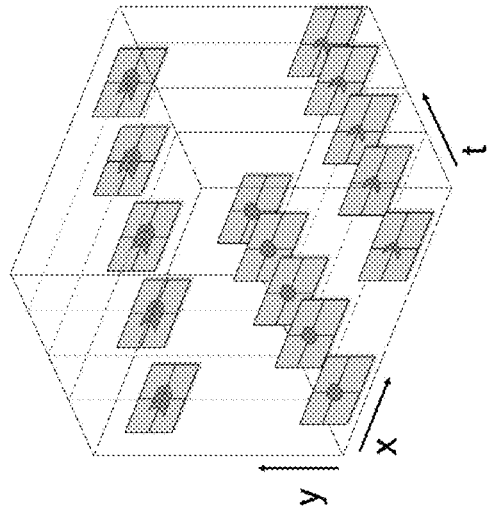
FIGS. 1A-1C are a series of illustrations showing traditional frame-based computing captures and processes entire frames, ROI-based computing samples encoding regions of interest but at uniform spatial and temporal resolution, and rhythmic pixel encoding regions where different encoding regions are captured at different spatio-temporal resolutions.

Various embodiments of a system and associated hardware for a visual sensing pipeline that utilizes a rhythmic pixel encoding region capture method are disclosed. This work aims to improve the capabilities of continuous mobile vision systems, based on a key insight: The precision, performance, and efficiency of visual computing systems are limited by the current pattern of capturing and processing entire image frame streams at uniform spatial resolutions and uniform frame rates. This assumption of frame-based computing (shown in FIG. 1A) presents an inflexibly coarse granularity of tradeoff between task accuracy and energy efficiency. Most natural scenes do not have the same resolution needs across the entire image frame. Precise AR placement requires high spatial resolution for visual features on tracked surfaces, but would suffice with a relatively lower resolution for the rest of the frame. The detection and tracking of faces, hands, and objects could use a higher temporal resolution to capture quick motions, while the rest of a relatively static scene would suffice with a lower frame rate. Such tradeoffs are unavailable with the current model of frame-based computing.

Figure 1B:
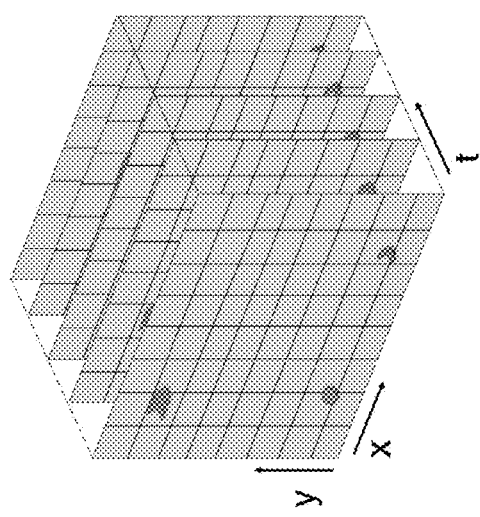
Figure 1C:
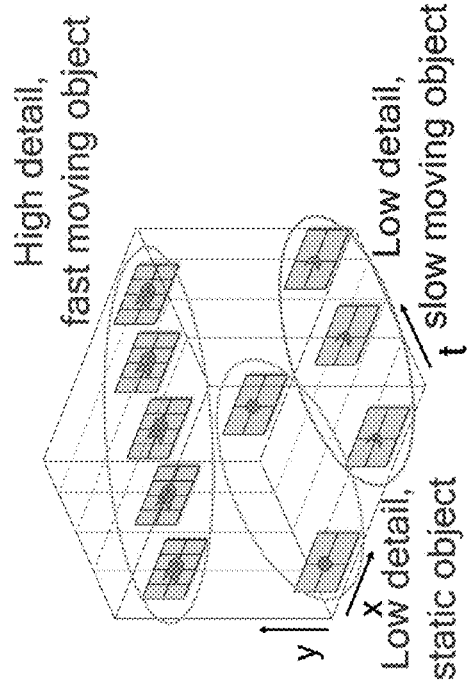

To address this, the present disclosure presents a fundamental shift away from frame-based visual computing and towards rhythmic pixel encoding regions (FIG. 1C), which are defined as neighborhoods of pixels with encoding region-specific spatiotemporal resolutions. Unlike visual computing based on a few regions-of-Interest (ROIs) (shown in FIG. 1B), rhythmic pixel encoding regions leverage encoded data representations that scalably allow for the capture of hundreds of encoding regions, with independently-defined spatiotemporal resolutions. By supporting the simultaneous capture of a diversity of rhythmic pixel encoding regions, the visual computing architecture of the system 100 allows the developer to selectively specify encoding regions where higher spatiotemporal resolution is needed and where lower spatiotemporal resolution will suffice (Table 1), e.g., dynamically guided by the properties of the visual features. The fine-grained configurability will allow developers to extend their existing visual computing algorithms and applications for high energy efficiency. This creates the illusion of high spatiotemporal resolution capture at low power consumption by eliminating the wasteful dynamic random access memory (DRAM) traffic of unproductive pixels.

1. Introduction

High spatiotemporal resolution can offer high precision for vision applications, which is particularly useful to capture the nuances of visual features, such as for augmented reality. Unfortunately, capturing and processing high spatiotemporal visual frames generates energy-expensive memory traffic. On the other hand, low resolution frames can reduce pixel memory throughput, but also reduce the opportunities of high-precision visual sensing. However, not all parts of the scene need to be captured at a uniform resolution. Selectively and opportunistically reducing resolution for different regions of image frames can yield high-precision visual computing at energy-efficient memory data rates. To this end, the present disclosure provides a visual sensing pipeline architecture that flexibly allows application developers to dynamically adapt the spatial resolution and update rate of different "rhythmic pixel regions" in the scene. The present disclosure provides a system that ingests pixel streams from commercial image sensors with their standard raster-scan pixel read-out patterns, but only encodes relevant pixels prior to storing them in the memory. Streaming hardware is also presented to decode the stored rhythmic pixel region stream into traditional frame-based representations to feed into standard computer vision algorithms. Encoding and decoding hardware modules can be integrated into existing video pipelines. On top of this, the present disclosure also provides runtime support allowing developers to flexibly specify the region labels. Evaluating the system on a FPGA platform over a variety of vision workloads shows significant reduction in interface traffic and memory footprint, while providing controllable task accuracy.

Figure 2A:
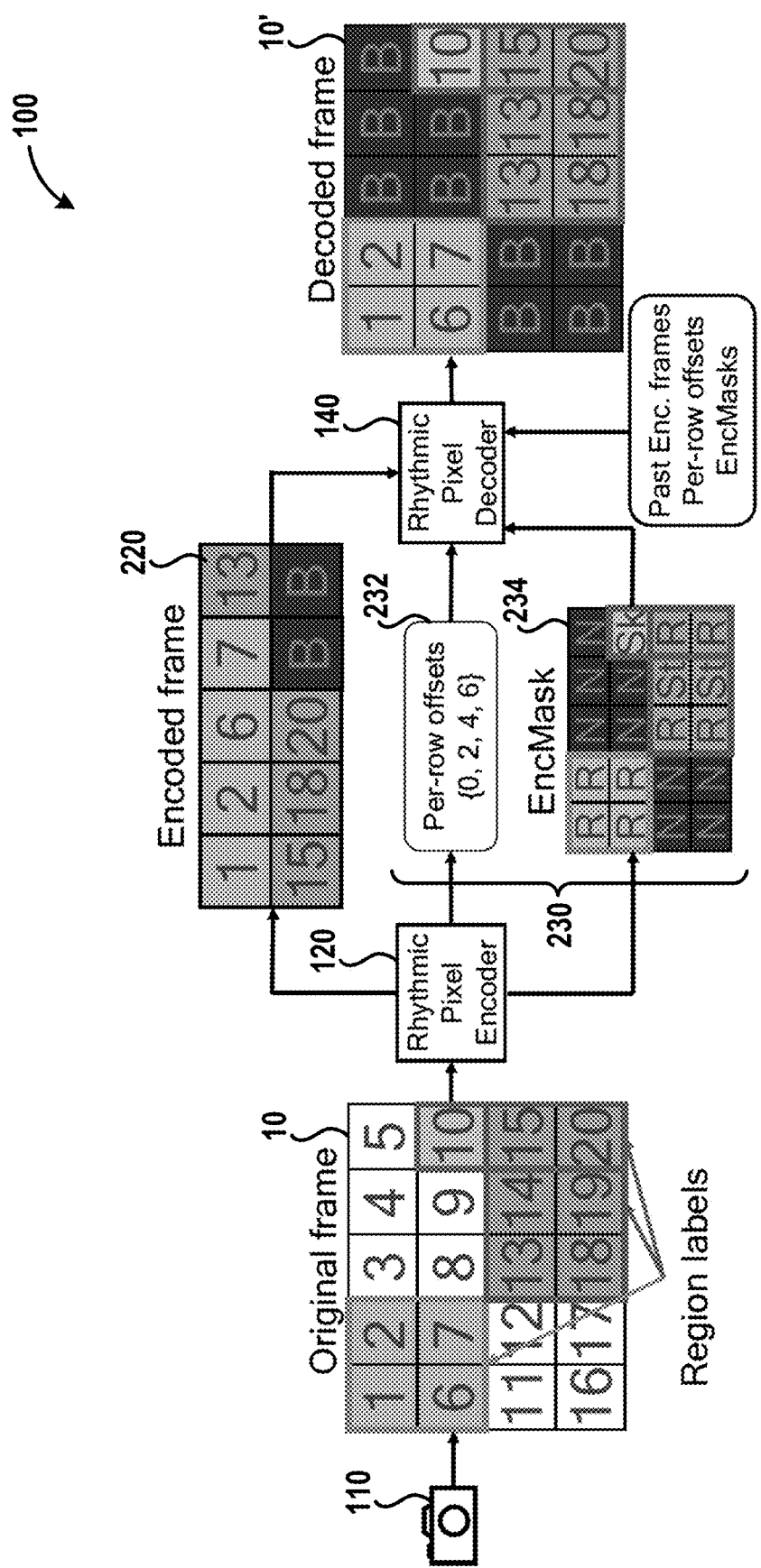
FIGS. 2A and 2B are a series of illustrations showing a process of encoding and decoding according to a visual sensing pipeline system disclosed herein in which the encoder packs pixels within the encoding regions from the original image, maintaining raster-scan order and the decoder reconstructs data from the encoded frame, per-row offsets, and encoding mask.
Figure 2B:
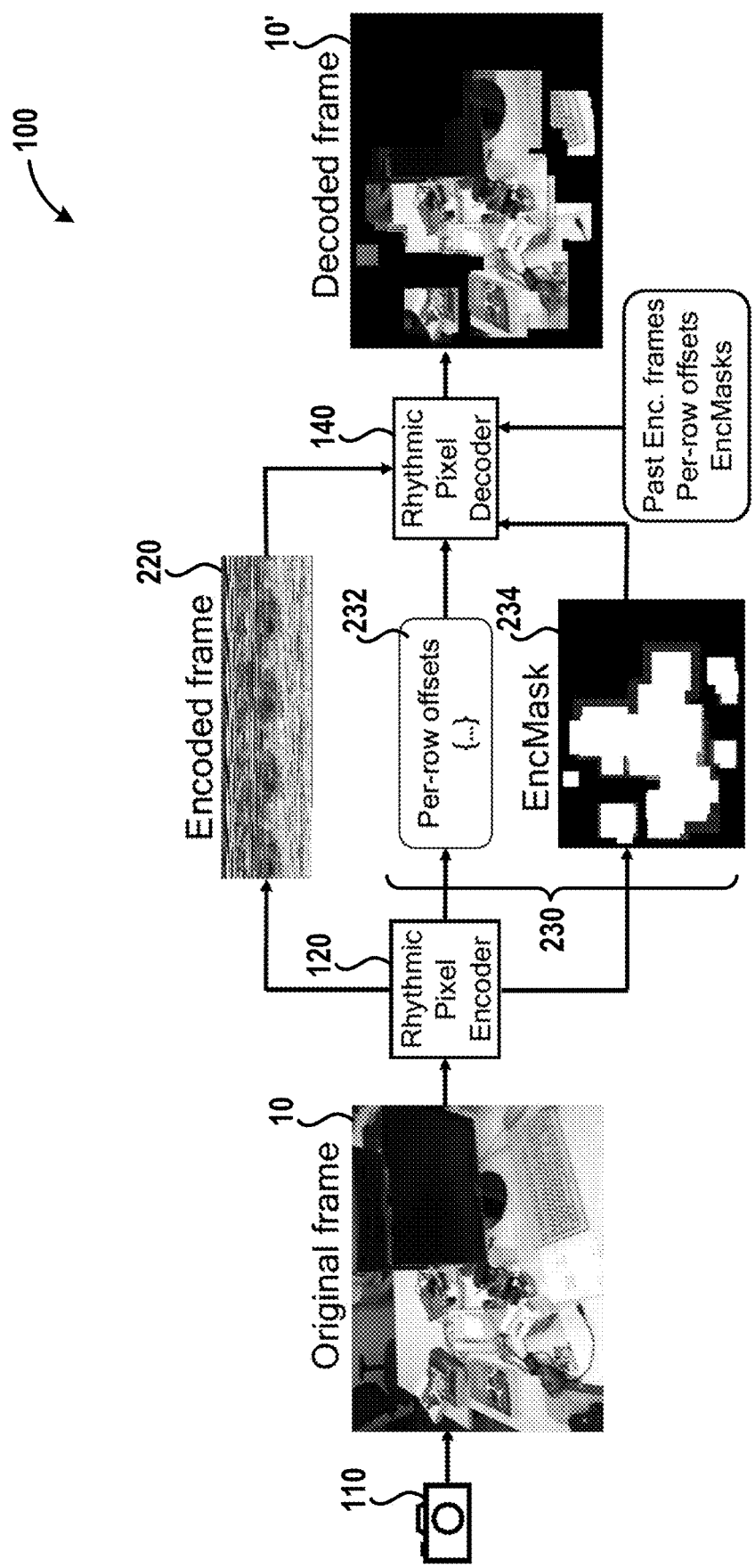

To design the rhythmic pixel encoding region abstraction and the architecture to support it, two hardware sensor data interfaces are introduced. With reference to FIGS. 2A and 2B, a system 100 disclosed herein includes an encoder 120 to selectively reduce sets of pixels before they are stored in memory, and a decoder 140 to reconstruct the pixels from memory into traditional frame-based addressing for use by a standard vision application. Together, the encoder 120 and decoder 140 work to reduce the significant DRAM traffic of writing and reading visual data by considering rhythmic pixel encoding regions, leading to system energy savings. These interfaces, which integrate into the System-on-Chip, support existing and future high-resolution image sensors, allowing for a revolutionary upgrade to evolutionary mass-market-scale image sensors.

The idea of selectively determining which parts of a frame can be encoded and decoded is central to several other technologies such as video compression, multi-ROI cameras, and event-based cameras; however, these technologies are not always sufficient. Specifically, video compression decimates pixels after DRAM as it needs multiple frames inside DRAM for block matching. On the other hand, there are off-the-shelf multi-ROI cameras that support ROI-based readout. But the problem with those cameras is they do not scale with regions. That is, they do not allow configuring and reading several hundreds of regions. Finally, there are event-driven cameras in which each pixel is encoded as a change in intensity instead of just intensity. The problem with those cameras is they do not scale with resolution because of their bulky per-pixel circuitry.

The present disclosure presents details of the system 100 that incorporates rhythmic pixel encoding regions to address these limitations by providing architecture and runtime support for three important things. First, the system 100 is able to support region-based resolution control instead of frame-based control. And this control must be done before DRAM to save pixel memory traffic, and must also be done at scale in order to support sampling of several hundreds of regions without blowing up the number of hardware resources.

Evaluation of the system 100 was performed on a Xilinx ZCU102 FPGA system-on-chip (SoC) platform. The system 100 supports various visual workloads, including hardware-accelerated neural network processing for face and object tracking, and OpenCV-based Visual Simultaneous Localization and Mapping (V-SLAM). Through evaluation, the opportunity of rhythmic pixel encoding regions is demonstrated to decrease pixel memory traffic by 43-64% while only minimally degrading the visual task accuracy, e.g., only increasing absolute trajectory error of V-SLAM from 43±1.5 mm to 51±0.9 mm in the case study. Through reduction in memory traffic, rhythmic pixel encoding region-based techniques can significantly increase the energy-efficiency of battery-backed mobile systems.

In summary, the present disclosure describes the following contributions:
- The system 100 provides a visual computing paradigm where different parts of the scene are captured at different spatiotemporal resolutions—before the frame enters memory—for overall system energy-efficiency while respecting task needs.
- The system 100 includes two lightweight and scalable IP blocks: the encoder 120 and decoder 140 which incorporate rhythmic pixel encoding regions to decimate the incoming pixel stream while writing to memory and reconstruct the pixel stream on-the-fly while reading from memory.
- The present disclosure also describes a library and runtime to coordinate vision tasks with encoder/decoder operation.
- Architecture and runtime support are augmented on top of an existing commercial mobile vision pipeline built around a FPGA platform. The augmented architecture is evaluated on a variety of vision tasks to demonstrate significant reduction in memory traffic with controllable accuracy loss.

2. Related Work

A primer on vision pipelines: The ecosystem of visual computing sensors, devices, systems, and algorithms on mobile devices have rapidly evolved to provide high-performance platforms for multitude of vision tasks such as augmented reality on smartphones, tablets, and headsets.

Image sensors collect digital readings of visual pixels in a frame. The sensor sends values over a streaming Mobile Industry Processor Interface (MIPI), which enacts a serial transmission over multiple lanes. The MIPI receiver inside the SoC receives the frame information from camera. In the sensor or on the system-on-chip, there is often an image signal processor (ISP) inserted into the visual computing pipeline, performing image improvement operations, e.g., white balance, and format changes, e.g., YUV conversion. Regardless of the placement and operation of the ISP, the visual hardware pipeline eventually writes the frame into DRAM and signals to the operating system that a frame is ready for readout from the memory.

Data movement across the off-chip MIPI and DDR interfaces entails significant energy consumption. While tasks such as AR could significantly benefit from high spatiotemporal resolutions, e.g., 4K at 60 fps, these resolutions generate high data rates across the camera and memory interfaces. For example, a system expends 2.8 nJ to move a pixel across the DDR interface, whereas it expends only 4.6 pJ for performing a multiply-and-accumulate (MAC) operation around that pixel.

For AR, software processes a frame through visual computing frameworks, extracting visual features to feed into Simultaneous Localization and Mapping (SLAM) algorithms. These algorithms form a spatial understanding of the scene to estimate the pose of the camera. The pose of the virtual camera is precisely updated to the estimated pose of the physical camera. This allows the system 100 to overlay virtual objects over the physical environment, achieving the AR illusion.

Multi-ROI sensors: Many image sensors can select a region-of-interest (ROI) for readout. There are also sensors that allow for multiple ROIs to be read out. As encoding region selection is performed at the sensor level, it offers efficiency and speed by reducing sensor readout time. However, there are significant limitations to adopting these sensors for mobile systems. In particular, the expressiveness of sensor-based encoding region selection is limited by the footprint of additional circuitry. For example, in one such sensor, the region selection is limited to 4 regions, regions cannot overlap, and only full resolution and frame rate are available. In contrast, support for rhythmic pixel encoding regions provides extensive configurability and composability through the inherent scalability of the encoded data representation. This allows a much larger number of encoding regions (hundreds), and grants each encoding region independent resolution and rhythm/interval control. Moreover, the system 100 implements encoding region selection in the SoC, which allows any conventional image sensor to employ multi-ROI benefits, including emerging high resolution and high framerate sensors.

Event-driven cameras: Event-driven cameras, also known as dynamic vision sensors, focus their sampling on pixels that change their value. This allows for a significant reduction in sensor bit rate and allows microsecond time resolution. However, the circuitry is spatially expensive due to per-pixel motion detection module, reducing frame resolution, e.g., to 128×128 pixels. This limits the scalability of these sensors to support high resolutions. More fundamentally, the logic of deciding what pixels to read out is limited at hardware design time, disallowing high-level and/or semantic knowledge from governing the pixel selection process. Thus, while the system 100 shares similar motivations and inspirations—reducing data rate for efficiency and performance—the present system uniquely allows the expressive ability to dynamically use knowledge of visual feature extraction needs to selectively sample pixels as needed.

Image/Video Compression: Decades of work in image processing has gone towards compressing images and videos to reduce the bit rate of storing and transmitting media. For example, JPEG and other image compression standards reduce information at spatial frequencies with less perceptual priority. MPEG-H Part 2/HEVC/H.265 reduce redundant information by leveraging estimated motion information from frame-to-frame. However, such entropy-coding compression techniques require the frame—or multiple copies of the frame—in memory before compression can be done. This incurs the memory overhead of visual computing that rhythmic pixel encoding regions strives to avoid; the system 100 performs encoding before the frame enters the DRAM. Traditional video codecs also employ sophisticated techniques such as discrete cosine transform (DCT) and motion compensation for data reduction, increasing their design complexity. In contrast, the system 100 uses simple "pixel discard"-based strategies for data reduction.

Foveated Rendering: To improve graphical rendering capabilities under limited computing resources, foveated rendering focuses rendering effort where users are likely to notice. Foveated rendering uses eye tracking to estimate user gaze and renders content near the gaze target at higher spatial resolutions. The system 100 applies similar motivation, increasing spatiotemporal resolution where it is needed, but with a distinctly different goal: to only capture necessary visual information. Among other differences, the system 100 involves multiple simultaneous encoding regions, as opposed to the singular encoding region in foveated rendering.

Flexible spatiotemporal sampling algorithms: Computer vision researchers propose different algorithms that modulate different encoding regions in an image with different spatiotemporal resolutions for computational photography and video prediction use-cases. Flexible Voxels proposes an efficient space-time sampling scheme that enables per-pixel temporal modulation and a motion-aware reconstruction scheme for artifact-free videography. More advanced techniques have been proposed for space-time sampling and interpolation for video compressive sensing and highspeed imaging.

More recently, researchers proposed neural networks to generate high frame rate videos from low frame rate counterparts. These networks analyze spatiotemporal patterns across frames in a video to create interpolated frames. While the system 100 uses spatiotemporal sampling mechanisms, the present disclosure focuses on providing the architecture and runtime support to enable spatiotemporal rhythmic capture on an embedded system.

Energy-efficient visual systems. To reduce energy consumption and bandwidth utilization, some systems offload only interesting frames to the cloud, discarding the rest. Determining which frames to discard itself is often an expensive task. To this end, other systems implement a dedicated hardware/software subsystem using an array of gating sensors and imagers. Other hardware-software co-design techniques reuse computation for energy-efficient visual computing. Euphrates reuses the motion vector information from the ISP to extrapolate bounding box results for object detection to avoid extraneous vision processing on certain frames. EVA[2] exploits temporal redundancy between frames and uses motion compensation techniques to approximate CNN results. ASV applies stereo-specific algorithmic and computational optimizations to increase the performance with minimum error rate. Instead of approximating computation, the system 100 primarily focuses on reducing the memory traffic of sensing by discarding pixels early in the vision pipeline. As such, rhythmic pixel encoding regions can be complementary to the aforementioned visual processing techniques, with approximate computing filling in the visual gap of unsampled pixel data.

TABLE 1

| Opportunities for Rhythmic Pixel Encoding regions | | |
|---|---|---|
| | Traditional uniform frame-based vision | Rhythmic pixel encoding region-based vision |
| Spatial Resolution | If any part of the frame needs to be captured at a high resolution, e.g., to resolve complex texture or distant objects, the entire frame will need to be captured at a high resolution. | Encoding regions with small, detailed, and/or distant features can be captured with the precision of high resolution. Frame encoding regions with large, static, close visual features can be captured with the efficiency of low resolution. |
| Temporal Resolution | If any part of the frame needs to be captured at a high frame rate, e.g., to track substantial motion, the system will need to capture a sequence of entire frames of pixels at high frame rate. | Encoding regions can be captured at different intervals. The entire frame can be scanned to update spatial understanding at a lower rate, e.g., 1 fps. Encoding regions of moving objects/surfaces can be captured at higher rates, e.g., 60 fps. |

3. Visual Computing with Rhythmic Pixel Encoding Regions

The overarching concept of rhythmic pixel encoding regions as applied by the system 100 is to encode visual information captured by conventional sensors such that the encoded visual data: (i) meets real-time visual requirements specified by application developers, (ii) reduces the pixel memory throughput and footprint of pixel stream data into DRAM, and (iii) can be reconstructed into visual frames for application usage. Here, key data structures are introduced that specify the encoding region labels, the encoded pixels, and associated meta-data, and how these data structures are used to perform pixel sampling and interpolation to satisfy visual needs. The effect of this new paradigm is illustrated on a case study based on visual SLAM. FIGS. 2A and 2B provide an overview of the system 100.

3.1 Developer-Specified Encoding Region Labels

To mark the encoding regions to be captured, as well as their spatiotemporal qualities, the system 100 allows developers to specify a set of encoding region labels (FIG. 2A) to define a capture workload. Each encoding region label includes the following attributes:

- The coordinates of the top-left corner of the encoding region
- The dimensions (e.g., width and height) of the encoding region
- The stride resolution of the encoding region, i.e., the density of pixels
- The skip rate, i.e., the time interval of consecutive sampling 3.2 Encoded Frame The encoder 120 uses the encoding region labels to selectively store a reduced set of pixels into memory, forming an encoded frame 220 from an original frame 10. Pixels within any of the encoding region labels are stored in original raster-scan order, while omitting any pixels that do not fall within encoding regions, or are not within the rhythm of the stride or skip. This results in a tightly packed encoded frame (FIG. 2A).

Notably, traditional ROI-based computing typically adopts a different memory representation, storing each encoding region of pixels as a grouped sequence in memory. For the small number of encoding regions that ROI-based computing typically supports, this may suffice, but when scaled to hundreds of encoding regions, this creates unfavorable random access patterns into DRAM and/or buffering of large portions of the frame into local SRAM when writing pixels into memory. Furthermore, overlapping encoding regions will duplicate the storage of pixels that appear in multiple encoding regions. Instead, by preserving raster scan order, the rhythmic encoded frame representation implemented by the system 100 instead retains sequential write patterns. This allows for highly efficient scalability to raised number of encoding regions with minimal resource overhead.

3.3 Encoding Metadata: Per-Row Offset, Encoding Mask (EncMask)

To service pixel requests from the vision applications, the decoder 140 will need to translate pixel addresses in the original frame 10 into pixel offsets in the encoded frame 220 before retrieving the pixel values. However, this would limit scalability of the decoder 140, as the complexity of the search operation quickly grows with additional encoding regions.

Thus, instead of using encoding region labels, the present system 100 implements an alternative method that uses two forms of encoding metadata 230 for the decoder 140 to reconstruct the original pixel stream (FIG. 2A) into a decoded frame 10'.

First, a per-row offset 232 of the encoding metadata 230 counts the number of encoded pixels prior to that row in the image. Second, an encoding mask 234 (e.g., an encoding sequence bitmask "EncMask") of the encoding metadata 230 helps the decoder 140 to reconstruct a pixel stream without the need for encoding region labels. For each pixel in the original (pre-encoding) frame 10', the encoding mask 234 uses a two-bit status that indicates how a pixel is sampled in space and time:

N (0 0): Non-regional pixel
St (0 1): Regional pixel but strided
Sk (1 0): Regional pixel but temporally skipped
R (1 1): Regional pixel Together, the per-row offset 232 and encoding mask 234 allow the decoder 140 to find the relevant pixel address in the encoded frame 220, and access the appropriate values from the current encoded frame 220 or previous encoded frames to decode the pixel. More information about this process is provided in Section 4.2.

3.4 A Case Study Around ORB-SLAM

ORB-SLAM is a popular real-time V-SLAM algorithm, highly centered around tracking visual "features", creating a map of localized features, and finding matches to previously mapped features for continual positioning. Visual features—key for scene understanding—are scattered throughout a scene and carry different spatiotemporal needs. While running ORB-SLAM for augmented reality, for example, the feature extractor routinely detects several hundreds of features (e.g., 1500 features in a 1080p frame) at varying distances from the camera. This motivates the need to sample hundreds of encoding regions around hundreds of features with need-specific resolutions. Features can be grouped into a smaller number of encoding regions, but this reduces task accuracy and memory efficiency, as demonstrated in § 6.

In the context of rhythmic pixel encoding regions, ORB features will be in the decoded pixel streams. Encoding regions covering the entire frame can be captured at a slower skip rate to maintain coverage of features as the device moves around the space. In between full captures, detected features in both full and partial captures can guide encoding region label selection for the subsequent frame, defining encoding regions around feature locations and with properties based on feature characteristics. Specifically, one policy uses the feature's "size" attribute to guide the width and height of the encoding region. Along similar lines, it uses other feature attributes such as "octave" for stride and feature movement between frames for temporal rate. The encoder 120 uses these feature-based encoding region labels to selectively store pixels of interest and metadata into memory. The decoder 140 uses these to reconstruct the frames for the algorithm to access and use for ORB-SLAM and further encoding region selection.

Figure 3B:
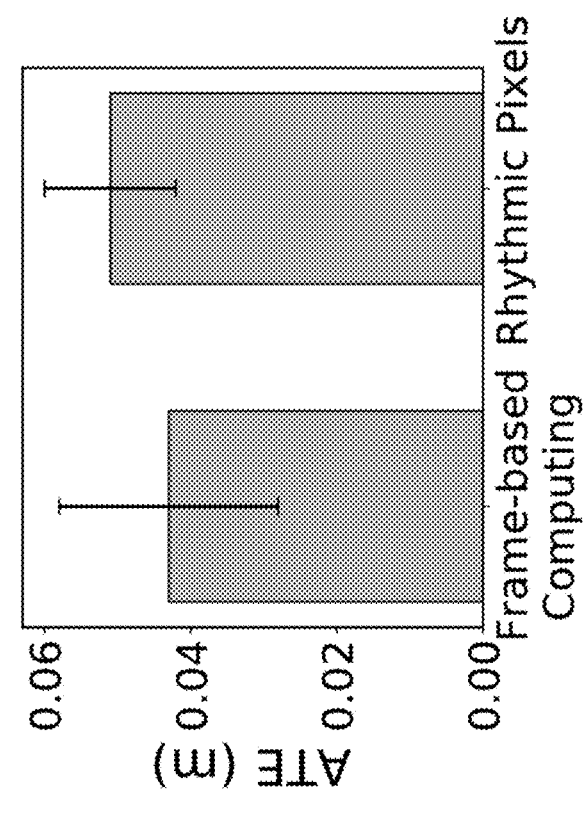
FIGS. 3A and 3B are each respective graphical representations showing pixels captured and absolute trajectory error for ORB-SLAM; it was shown that rhythmic pixel encoding regions can discard irrelevant pixels early in the pipeline for memory efficiency, while preserving relevant encoding regions at sufficient resolutions for accuracy.
Figure 3A:
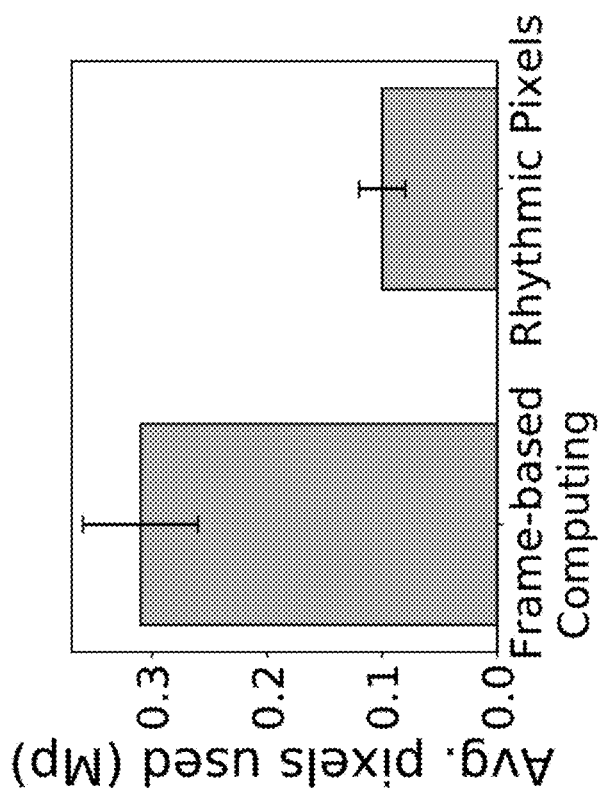

The efficacy was evaluated over the TUM dataset of 480p videos, capturing full frames every 10 frames and feature-based encoding regions for other frames. As shown in FIGS. 3A and 3B, it was found that using rhythmic pixel encoding regions can eliminate the memory storage of 66% of the pixels of the original stream, while only increasing absolute trajectory error from 43±1.5 mm to 51±0.9 mm. The applicability of rhythmic pixel encoding regions is further explored for visual workloads.

4. Design

Figure 4:
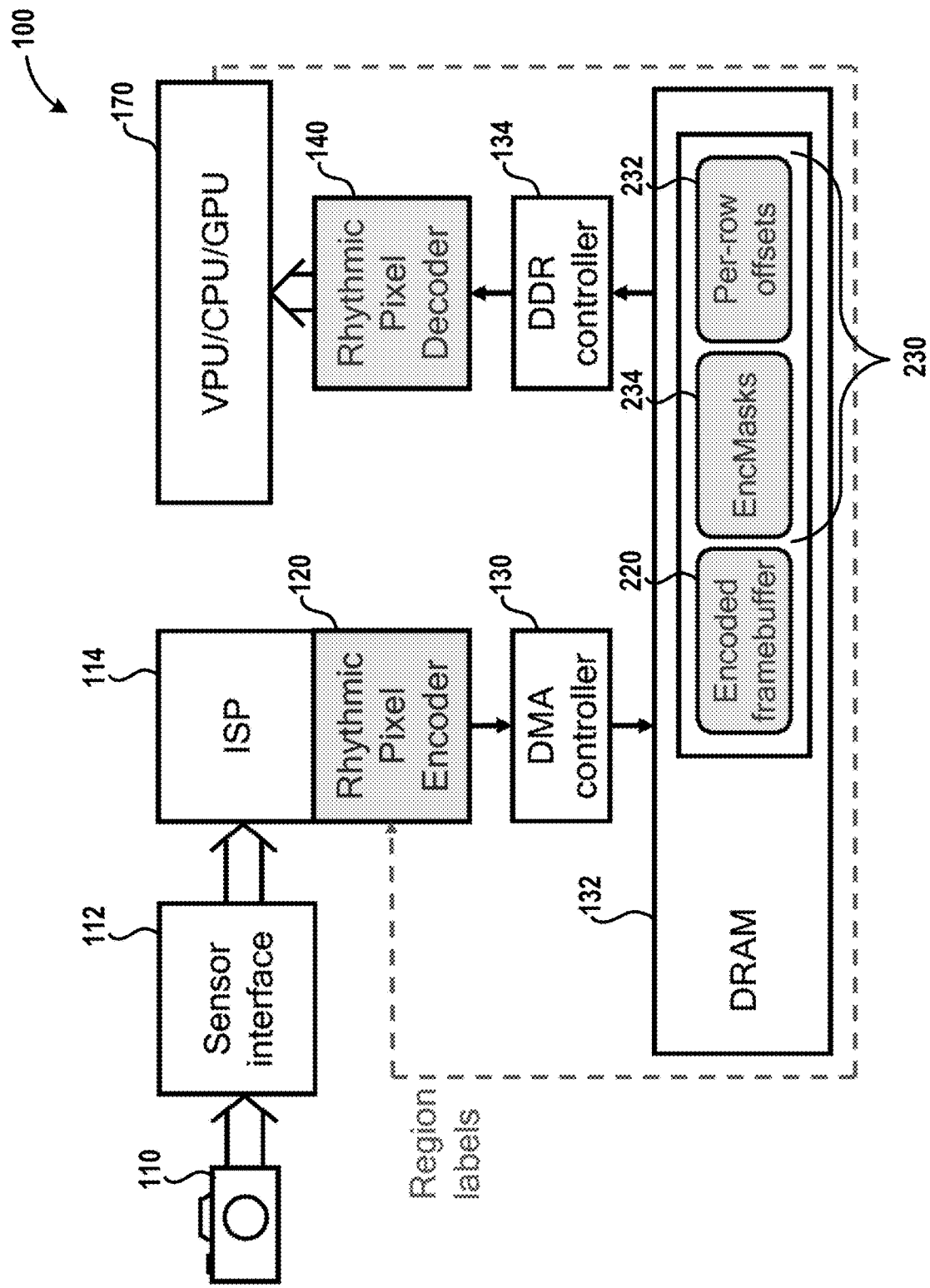
FIG. 4 is a simplified block diagram representation showing a visual sensing pipeline system in which the rhythmic encoder decimates the incoming pixel stream from camera and encodes only encoding region-specified pixels into memory, and the rhythmic decoder decodes the pixels for use with the vision algorithms.

FIG. 4 shows a simplified block diagram of the system 100 implementing a visual sensing pipeline. The rhythmic pixel encoding region architecture centers around the idea of: (i) encoding pixel streams to reduce the pixel data stored in memory, and (ii) decoding the pixel streams for vision application usage. Here, the design aspirations that guide the architecture of the system 100 are described. As shown, the system 100 includes or otherwise receives information indicative of an original frame 10 captured by a sensor 110 (e.g., an image capture sensor such as a camera), which communicates sensor data to a sensor interface 112 in communication with an image signal processor (ISP) 114, which can be part of an existing mobile SoC vision pipeline. This disclosure provides the design of the encoder 120 that encodes and stores information from the ISP 114 within a DRAM 132 as encoded frames 220 (e.g., at an encoded framebuffer within DRAM 132 having framebuffer addresses) along with associated encoding metadata 230. The system 100 can include a Direct Memory Access (DMA) controller 130 as part of the existing mobile SoC vision pipeline between the encoder 120 and DRAM 132.

This disclosure also provides the design of the decoder 140 that communicates with the DRAM 132 and an associated processing unit 170 (e.g., a CPU, visual processing unit (VPU), and/or GPU) to efficiently decode the encoded frames 220 based on their associated encoding metadata 230. The decoder 140 can communicate with the DRAM 132 through a double data rate (DDR) controller 134, which can be part of an existing mobile SoC vision pipeline. The software runtime for vision application developers to leverage these hardware extensions through policy specification is also discussed herein. Following the output of the decoder 140, the decoded frame 10' can be reconstructed from the original frame 10.

4.1 Rhythmic Pixel Encoder Architecture

Figure 5:
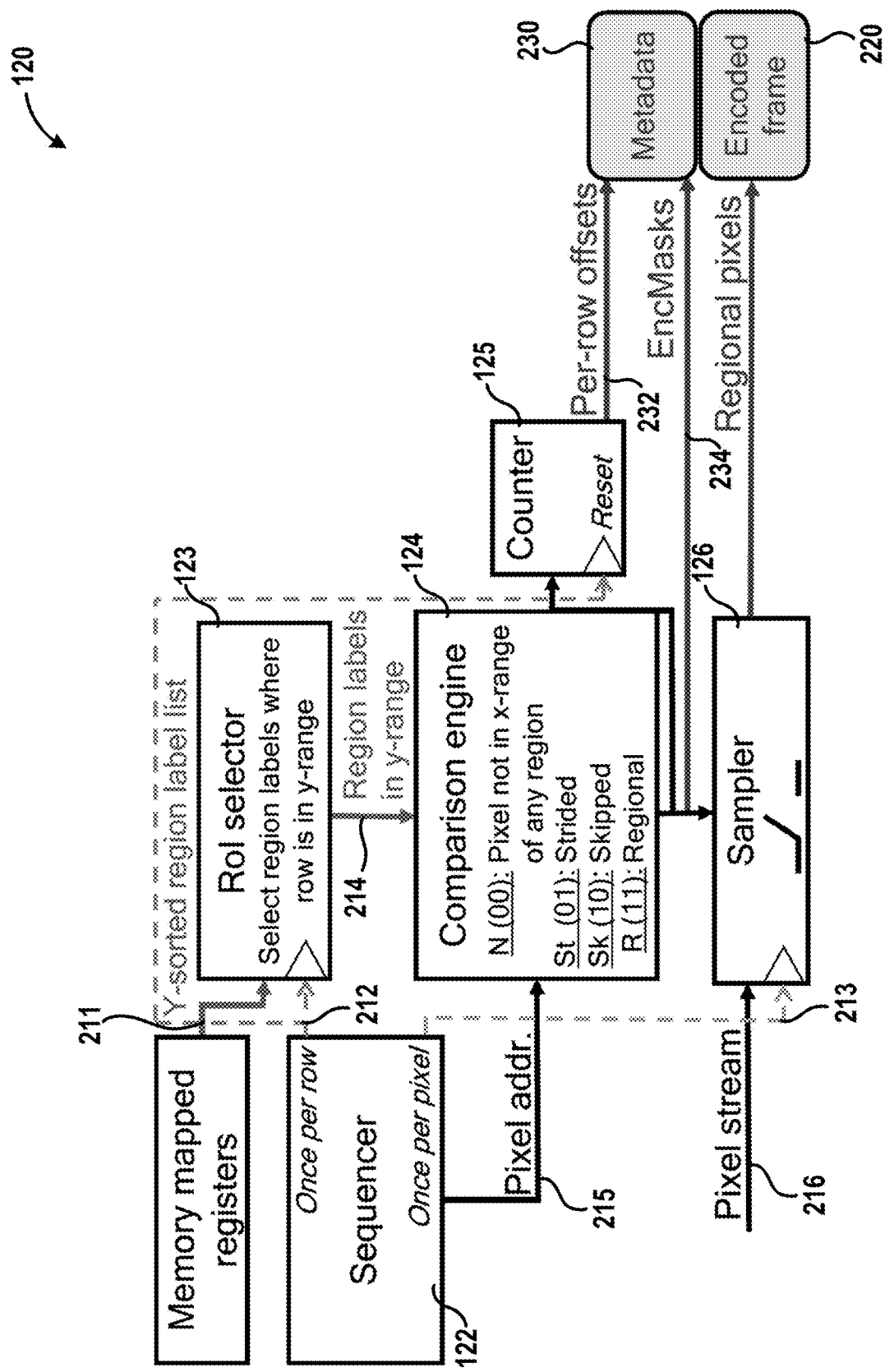
FIG. 5 is a simplified data flow diagram showing dataflow between components of the visual sensing pipeline system of FIG. 4 in which the encoder intercepts the incoming pixel stream and only forwards pixels that match the stride and skip specifications of any encoding region.

The encoder 120, shown in FIG. 5, intercepts data indicative of the original frame 10 (FIG. 4) as an incoming pixel stream 216 from an image sensor pipeline (e.g., received from sensor 110) and uses developer-specified encoding region labels (e.g., shown in FIG. 5 as a Y-sorted encoding region label list 211) to encode pixels into an encoded frame 220. The encoder 120 intercepts the incoming pixel stream 216 and only forwards pixels that match the stride and skip specifications of any encoding region. The encoder 120 also generates encoding metadata 230 (including the per-row offset 232 which is a count of the number of regional pixels in a row, and the encoding mask "EncMask" 234 which is the output of an encoding region comparison process), which are stored along with the encoded frame 220 in DRAM 132. The vision application specifies encoding region labels using the designed runtime support discussed in Section 4.3.

The encoder 120 is a fully streaming-based module that avoids the need for partitions to store individually addressed encoding regions. Instead, the encoder 120 directly operates on a dense raster-scan based pixel stream, produces a sparse encoded stream (e.g., including "regional pixels" which are selected to be within the RoI) based on the encoding region labels, and writes the encoded stream to the DRAM 132, all with on-the-fly streaming operation.

4.1.1 Raster-Scan Optimized Sampling

The encoder 120 includes a Sampler 126 that operates on the incoming pixel stream 216 and decides whether to sample a pixel in space and time based on whether the pixel is in any of the encoding regions (e.g., the Y-sorted encoding region label list 211) or not. A naive approach could sequentially compare a pixel's location against every encoding region label. This would be time consuming and would hinder pipeline performance. Although parallelizing the encoding region label checking process would solve performance issues, it was found that this exponentially increases the number of resources to support more encoding regions, limiting scalability of the encoder 120.

Instead, the approach of the system 100 is to exploit the raster-scan patterns of the incoming pixel stream 216 to reduce and reuse the work of the encoding region search. The encoder 120 includes a Sequencer 122 that keeps track of row and pixel location, including pixel addresses 215 (e.g., "once per row" 212 and "once per pixel" 213). For a given row of a frame, there is a smaller sub-set of encoding regions that are relevant—where a vertical position (e.g., y-index) of a relevant or "regional" pixel is inside of a vertical range (e.g., y-range) of the encoding region and matches the vertical stride. The encoder 120 can include an ROI Selector 123 that performs this search space reduction, which can include converting from the Y-sorted encoding region label list 211 to a sub-list (e.g., a sub-set of encoding region labels 214 in the y-range), once per row. Then, from pixel to pixel, pixel addresses 215 and the sub-set of encoding region labels 214 are provided to a Comparison Engine 124 of the encoder 120, which checks whether a horizontal position (e.g., x-index) of the pixel is inside any of the encoding regions in the sub-set of encoding region labels 214 and matches the horizontal stride. As the sub-set of encoding region labels 214 is much smaller than the Y-sorted encoding region label list 211 originally defined, this design choice substantially reduces the level of encoding region-based parallelism needed for the Comparison Engine 124, saving hardware complexity. As such, the Comparison Engine 124 compares a horizontal position of a pixel with a corresponding horizontal range of an encoding region defined within the set of encoding region labels. Based on this comparison, the Sampler 126 encodes one or more regional pixels into the encoded frame 220 that fall within the encoding region.

In addition, further optimizations for the Comparison Engine 124 can be performed based on spatial locality. Within a row of a frame, if a pixel belongs to an encoding region (e.g., is a regional pixel), the Sampler 126 can apply the same comparison result for the next encoding region width number of pixels. The system 100 also simplifies the process of finding relevant encoding regions for a row through sorting the encoding regions by their y-indices. This can be done by the rhythmic pixel encoding region app runtime.

The encoder 120 can further include a counter 125 that determines the per-row offset 232 by incrementing, for each regional pixel within a row of the encoded frame 220, the per-row offset indicative of a total quantity of regional pixels within the row. As shown, the counter 125 can receive an output of the Comparison Engine 124, and resets its "count" each time a new row is encountered (e.g., each time "once per row" 212 is updated).

4.1.2 Integration with ISP Output.

The placement of the encoder 120 has implications on the efficiency of the visual capture. The most energy-efficient integration of the encoder 120 would be on the sensor 110 itself, reducing pixel traffic over the sensor interface 112 and potentially reducing ISP computations. However, this may require a re-design of the ISP 114, which conventionally expects pixels in frame-based ordering in its algorithms. Thus, for some embodiments, the system 100 instead integrates the encoder 120 at the output of the ISP 114 as shown in FIG. 4 to seamlessly work with existing commercial ISPs.

As with typical ISP operation, the encoder 120 collects a line of pixels before committing a burst DMA write by the DMA controller 130 to a framebuffer within the DRAM 132 at framebuffer address 241 for efficient and performant memory transaction. Using a framebuffer allows asynchronous access to frame pixels. In the case of the rhythmic pixel architecture, the framebuffer also allows the system 100 to collect multiple frames of data, which the decoder 140 can use to extrapolate regional pixels over a sequence of frames for encoding regions with temporal skip rate. The encoding metadata 230 (per-row offset 232 and EncMask 234) of the encoded frame 220 is also stored alongside the framebuffer in DRAM 132. As the EncMask 234 occupies 2 bits per pixel, the present disclosure notes that it occupies 8% of the original frame data (e.g., 500 KB for a 1080p frame). As explored in evaluation, this amounts to a minimal memory overhead compared to the memory savings.

4.2 Rhythmic Pixel Decoder Architecture

Figure 6:
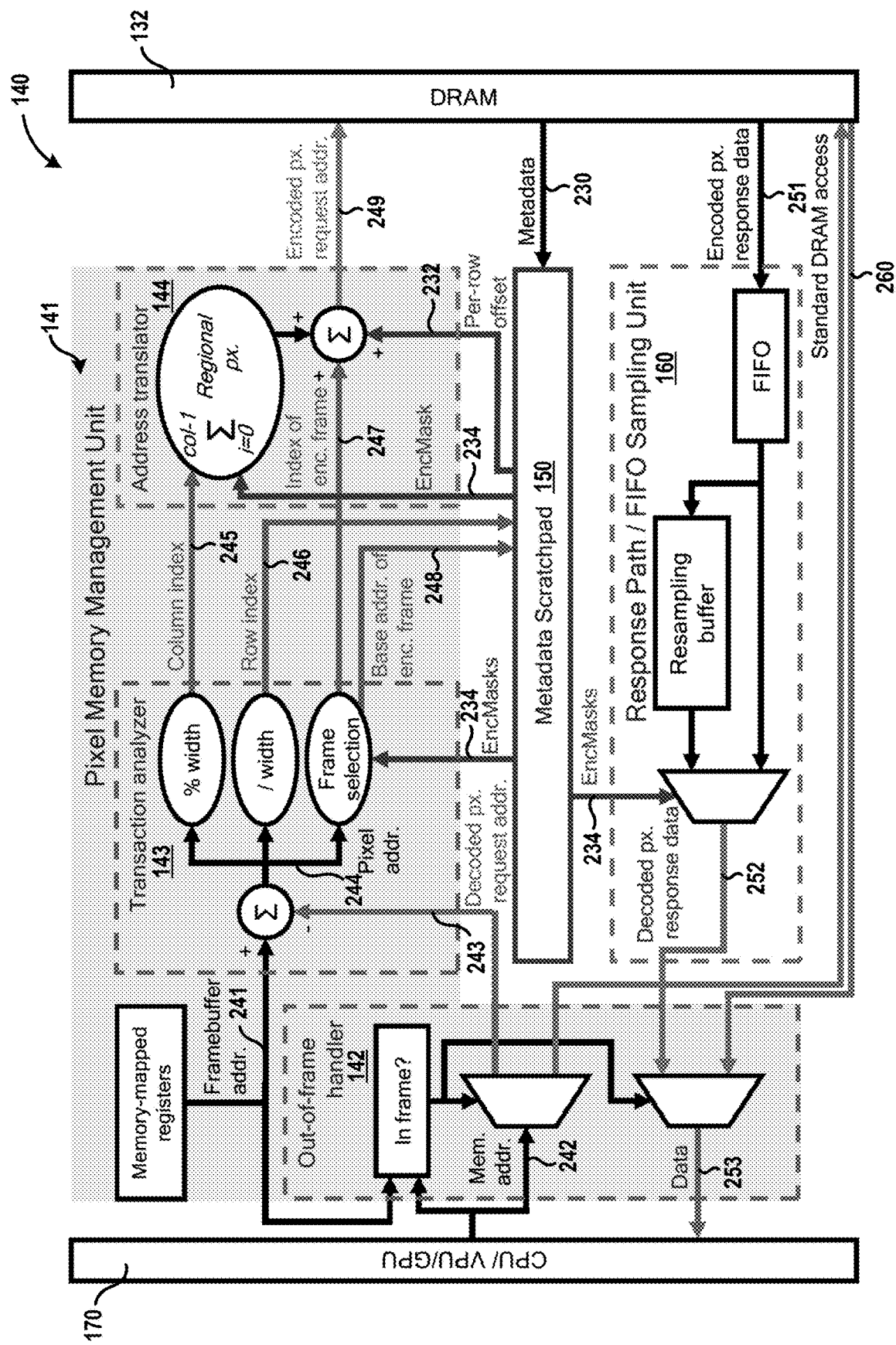
FIG. 6 is a data flow diagram showing dataflow between components of the visual sensing pipeline system of FIG. 4 in which the decoder fulfills pixel requests from the vision app in two steps: (a) A pixel MMU performs address translation to fetch the right set of pixel encoding regions from encoded frame; and (b) a "first in, first out" (FIFO) sampling unit reconstructs the original pixel encoding regions from encoded pixel encoding regions and metadata.

With reference to FIG. 6, the decoder 140 fulfills pixel requests from the vision application operating on the processing unit 170, which seek groups of sequential pixels from a decoded framebuffer stored at framebuffer address 241. The decoder 140 fulfills pixel requests from the vision app in two primary steps: (a) a pixel memory management unit (PMMU) 141 performs address translation to fetch the right set of pixel regions from the encoded frame 220; and (b) a response path 160 of the decoder 140 including a FIFO sampling unit reconstructs the original pixel regions from encoded pixel regions and encoding metadata. While the vision application forms its request around pixel locations in the decoded address space (e.g., as "decoded pixel request addresses" 243), the decoder 140 uses the encoding metadata 230 and encoded frames 220 to translate the decoded pixel request addresses 243 to the associated DRAM addresses of the pixels of the encoded frames 220 (e.g., "encoded pixel request addresses" 249 that correspond with framebuffer addresses 241 for the encoded frames 220). This translation step can incorporate the set of encoding metadata 230 associated with one or more previous frames (e.g., to take advantage of "stride" or "skip" rhythms at the response path 160 by re-sampling pixels from previous frames). This request path is managed by the pixel memory management unit (PMMU) 141 of the decoder 140, as described below and shown in FIG. 6.

After receiving an encoded pixel request address 249 from the PMMU 141 and after retrieving the associated information from the DRAM 132, the response path 160 of the decoder 140 returns pixel values (e.g., as encoded pixel response data 251) to the vision application through a "first in, first out" (FIFO) Sampling Unit. If required by spatial stride or temporal skip situations, the FIFO Sampling Unit interpolates encoded data (e.g., the encoded pixel response data 251) to create decoded pixel values (e.g., decoded pixel response data 252), which it provides as output data 253 to the processing unit 170. Otherwise, the decoder 140 returns a pixel value as output data 253, which can simply indicate a default value (e.g., black color with pixel value being hexadecimal #000000, or another suitable value) if the pixel was not within any of the specified encoding region labels (e.g., as indicated in the Y-sorted encoding region label list 211). As described below, the decoder 140 uses the encoding metadata 230 to make such determinations.

4.2.1 Pixel Memory Management Unit for Pixel Address Translation

The PMMU 141 works in the same spirit as a traditional memory management unit (MMU); however, while MMUs perform virtual to physical address conversion, the PMMU 141 translates pixel transactions from the decoded space (e.g., that the processing unit 170 operates within) to the encoded space (e.g., that the DRAM 132 operates within). Similar to an exception handler of an MMU, the PMMU 141 includes an Out-of-Frame Handler 142 that examines a memory request including the requested memory address 242 from the processing unit 170 and determines if it is a valid pixel request (i.e., if the requested memory address 242 is within the decoded framebuffer address space). If so, the requested memory address 242 is then considered the decoded pixel request address 243, which the Out-of-Frame Handler 142 forwards onward to a Transaction Analyzer 143 of the decoder 140; otherwise, the Out-of-Frame Handler 142 will bypass for standard memory access (e.g., standard DRAM access indicated by 260 in FIG. 6) based on the requested memory address 242.

Meanwhile, to decode the pixel associated with the decoded pixel request address 243, a Metadata Scratchpad 150 of the decoder 140 loads the encoding metadata 230 including per-row offset 232 and EncMask 234 information pertaining to the transaction for one or more most recent encoded frames. In one example implementation, the Metadata Scratchpad 150 retrieves encoding metadata 230 for four most recent encoded frames.

The Transaction Analyzer 143 of the decoder 140 determines a pixel address 244 by combination of the decoded pixel request address 243 with the framebuffer address 241, analyzes the associated EncMask 234, and generates different sub-requests for each pixel based on where the encoded pixels are present within the framebuffer. Based on the stride (St) and skip (Sk) values of the bits of the EncMask 234, the pixel may be in a "most recent" encoded frame 220, or one of the recently stored encoded frames 220. Thus, similar to a virtual memory request, translation of these pixel requests creates sub-requests that are characterized by a base address 248 (of the encoded frame 220), offsets (column index 245 and row index 246), and a tag index 247 (e.g., "index of encoded frame") indicating which encoded frame 220 hosts the desired pixels.

These sub-requests (e.g., column index 245, row index 246, the tag index 247 of the encoded frame 220) are fed to an Address Translator 144 of the decoder 140. For intra-frame requests, the base address 248 remains the same, whereas for inter-frame requests, the Address Translator 144 modifies the base address 248 appropriately. The Address Translator 144 reads the per-row offset 232 the encoding metadata 230 (e.g., stored within the Metadata Scratchpad 150). The column offset is the count of the number of full regional pixels from the start of the row until that pixel (The number of "11" entries in the EncMask). The Address Translator 144 sums this information to generate the encoded pixel request address 249 corresponding to each sub-request, which is sent to DRAM 132 to retrieve the corresponding encoded pixel response data 251.

4.2.2 FIFO Sampling Unit

The response path 160 of the decoder 140 includes a FIFO sampling unit in communication with a resampling buffer that buffers data packets (e.g., encoded pixel response data 251) received from the DRAM 132 fora pixel-based DRAM transaction. To prepare a pixel value to service the original request (e.g., from the processing unit 170), based on the EncMask 234, the response path 160 either: dequeues pixel data from the FIFO (in the case of the pixel being regional and not strided or skipped as indicated by the EncMask 234), re-samples the previous pixel (in the case of the pixel being strided or skipped as indicated by the EncMask 234), or samples a default pixel value (in the case of the pixel being non-regional as indicated by the EncMask 234). The output of the response path 160 is the decoded pixel response data 252, which can then be supplied to the processing unit 170 as output data 253. The decoder 140 also relays the RLAST control signal to indicate the last transfer in the transaction for proper handshake with the processing unit 170 for the memory request. Using the output data 253, the decoded frame 10' can be obtained.

4.2.3 Integration with DDR Controller

One implementation of the system 100 integrates the decoder 140 with the DDR controller 134 that may already exist inside the SoC. By doing so, the decoder 140 can intercept memory traffic coming from any processing element and service requests.

4.3 Developer Support for Rhythmic Pixel Encoding Regions

From the point of view of the processing unit 170—CPU, visual processing unit (VPU), or GPU—the rhythmic pixel encoding region architecture (e.g., the encoder 120 and the decoder 140) preserves the addressing scheme of the original frame-based computing through the decoded framebuffer address (e.g., framebuffer address 241). This allows fully transparent use of existing software libraries and hardware accelerators, with no modification needed.

The system 100 includes runtime support to allow the developers to flexibly specify encoding region labels as the Y-sorted encoding region label list 211. This includes an Encoding regionLabel struct and a SetEncoding regionLabels( ) function for developers to set a list of encoding regions. Encoding region label lists can be set on a per-frame basis or persist across frames. A runtime service receives these calls to send the encoding region label list to the encoder 120:

```
struct Encoding regionLabel {
    int x, y, w, h, stride, skip;
};
setEncoding regionLabels(list<Encoding regionLabel>);
```

4.3.1 Policy-Based Usage of Rhythmic Pixel Encoding Regions

Developers can build various policies that autonomously guide the encoding region selection, in the similar spirit to issuing frame configurations with the Frankencamera API or Android's Camera API. Policies can incur different system overheads, leading to system trade-offs. A policy should predict encoding region progression with time as well as an encoding region quality requirements to maximize task performance. A feature-based policy (such as that in the case study of Section 3.4) can use proxies, such as feature scale and feature displacement to estimate spatial and temporal resolutions of encoding regions. Developers can also introduce improved application-specific proxies with other prediction strategies, e.g., with Kalman filters.

The process of policy generation and modifying the app around that policy could be cumbersome for an app developer. To reduce the burden, two tiers of developers are proposed.

Policy Makers: The first tier of developers can specialize in policy development. They can write a wide variety of policies that employ a feature-based approach and/or sophisticated motion-vector based techniques, such as those found in Euphrates or EVA$^2$ to guide encoding region selection.

Policy Users: The second tier of developers could select a policy directly from a pool based on their app needs.

This dichotomy of policy makers/users follows a typical stratified development paradigm, where high-level developers can simply employ domain-specific libraries (e.g., cuDNN, cuFFT, cuBLAS) that are developed to take advantage of architectural complexity (e.g., with CUDA) by a different set of low-level developers.

Figure 7:
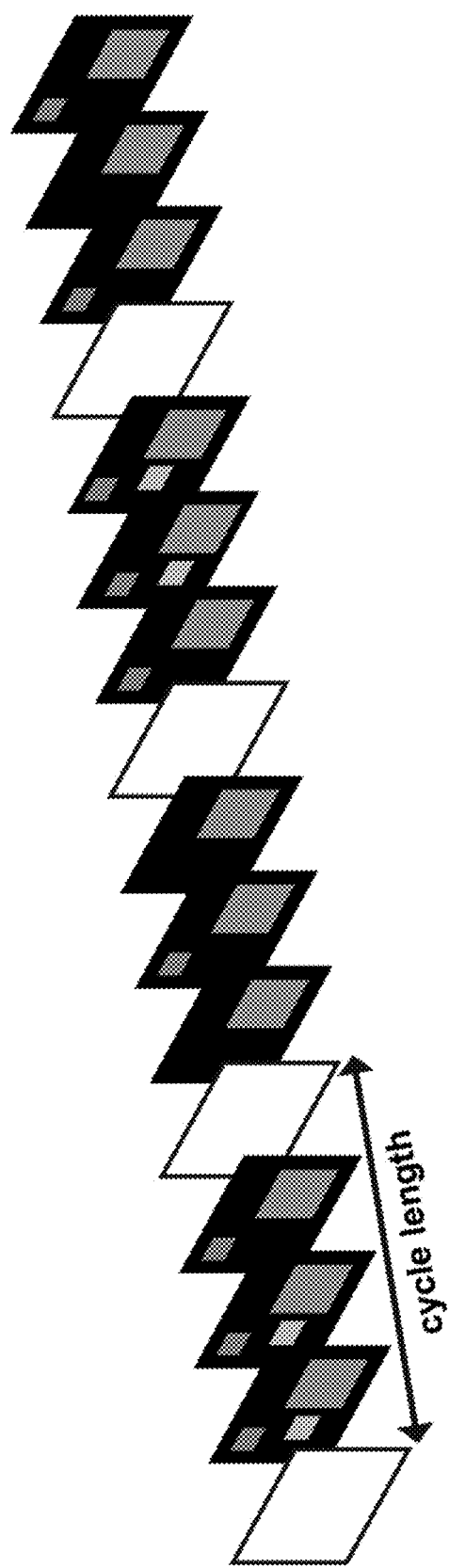
FIG. 7 is an illustration demonstrating a full-frame capture based on a "cycle length" periodicity to track objects leaving or entering a scene: with rhythmic pixel encoding regions, policies can define how different encoding regions in the image can be captured at nonuniform spatial and temporal resolutions, and in this illustrated policy encoding regions shaded in black are not sampled.
Figure 9C:
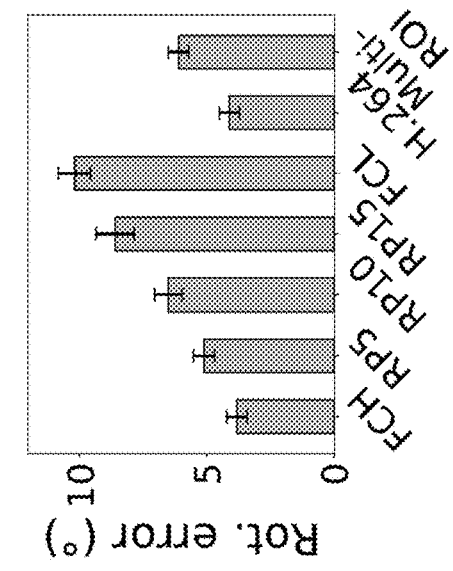
FIGS. 9A-9C are a series of graphical representations showing trajectory error, translational error and rotational error for Visual SLAM which shows high standard deviation.
Figure 9B:
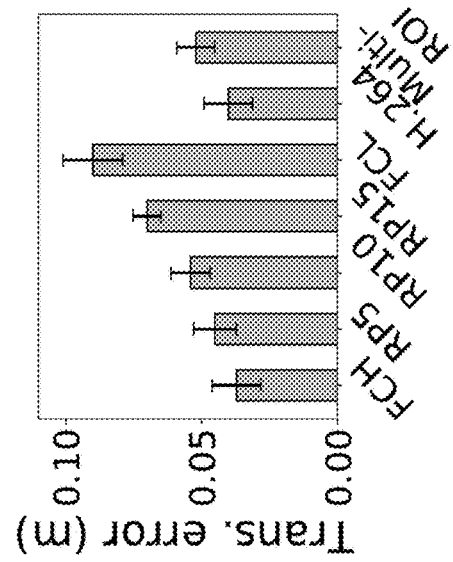
Figure 9A:
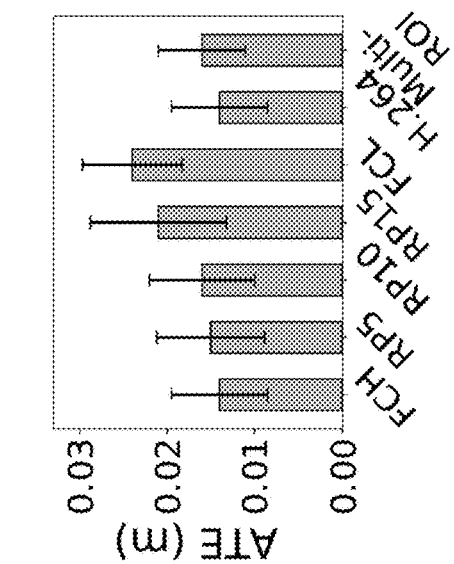
Figure 9E:
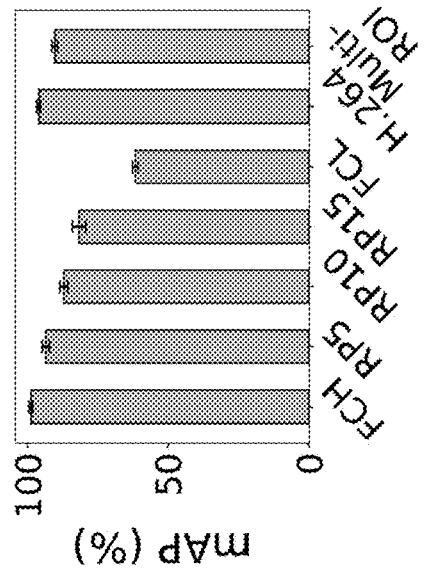
FIGS. 9D and 9E are a pair of graphical representations showing mean average precision (mAP) for human pose estimation and face detection.
Figure 9D:
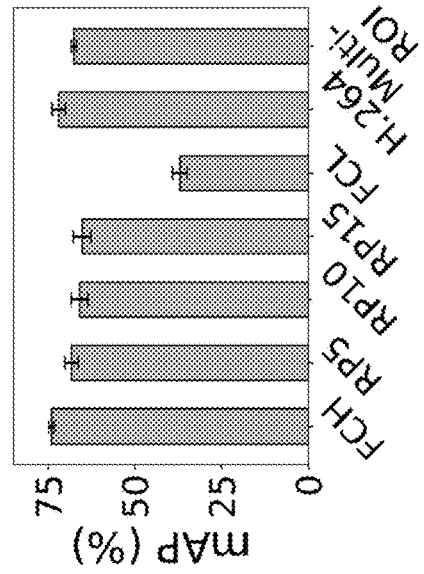

Example policy: As described in the case study, policies can center rhythmic pixel encoding regions around features, ensuring that features are captured at sufficient resolution. An example policy (FIG. 7) is defined around the concept of a cycle length, which is the number of consecutive frames between two full frame captures. With rhythmic pixel regions, policies can define how different regions in the image can be captured at non-uniform spatial and temporal resolutions. In the example policy shown in FIG. 7, regions shaded in black are not sampled. To track objects entering/leaving the scene, the system performs a full-frame capture on a "cycle length" periodicity. These occasional full frame captures can provide contextual information of the entire scene at a slower temporal rate, while feature-based encoding region tracking in the intermediate frames can provide continual coverage of important encoding regions.

The visual features processed by the app—readily available in memory—can be used to determine the pixel encoding regions for the next subsequent frame, centering around the features. For example, as discussed in § 3.4, an ORB feature's "size" (or scale) attribute can guide the width and height of its corresponding encoding region, ensuring that the meaningful neighborhood of pixels around the feature is captured (with extra margin to allow for frame-to-frame feature displacement). Furthermore, the "octave" attribute, which describes the texture of the feature, can determine the stride (resolution) parameter for each encoding region. Through the displacement of matched features from frame to frame and measuring the displacement, the system 100 can estimate the movement of an encoding region. The policy can use this feature velocity to determine the temporal rate parameter of pixel encoding regions, sampling fast moving encoding regions more frequently and slow-moving encoding regions less frequently.

This example policy is used and adapted to various visual workloads in the implementation and evaluation described herein. Different cycle lengths were evaluated, finding that as the cycle length increases, system efficiency improves, but the errors due to tracking inaccuracy also accumulate, and vice-versa. Cycle length thus becomes an important parameter to govern the tradeoff to meet application needs. The cycle length could also be adaptive, for example, by using the motion in the frame or other semantics to guide the need for more frequent or less frequent full captures. It is envisioned that future policies developed by a wider community of policy makers could substantially improve the opportunities of rhythmic pixel encoding regions.

TABLE 2

System components in the video pipeline

| Component | Specification |
|---|---|
| Camera | Sony IMX274, 4K @ 60 fps |
| ISP | Demosaic and Gamma correction, 2 Pixels Per Clock |
| CPU | ARM Cortex-A53 quad-core |
| GPU | ARM Mali-400 MP2 |
| NPU | Deephi DNN co-processor |
| DRAM | 4-channel LPDDR4, 4 GB, 32-bit |

TABLE 3

Vision tasks and benchmarks

| Task | Algorithm | Resolution | Benchmark | #Frames |
|---|---|---|---|---|
| Visual SLAM | ORB-SLAM2 | 4K @ 30 fps | In-house dataset | 6000 |
| Pose estimation | PoseNet | 720 p @ 30 fps | PoseTrack 2017 | 3792 |
| Face detection | RetinaNet | SVGA @ 30 fps | ChokePoint dataset | 22099 |

5. Implementation 5.1 FPGA-Based Encoder and Decoder Integration

Platform: One implementation of the system 100 uses Xilinx's reVISION stack platform which implements an end-to-end video pipeline that emulates a standard mobile embedded vision pipeline. As shown in Table 2, in one embodiment the system 100 utilizes Sony's IMX274 camera, a mobile class imager used in many smart-phones for high fidelity capture, i.e., 4K @ 60 fps. For the ISP, Xilinx's IP modules were used for performing demosaicing, gamma correction, and color-space conversion. These ISP blocks operate at a throughput of 2 pixels per clock for real-time performance. The processing subsystem comprises heterogeneous set of computing elements, similar to a mobile SoC. Specifically, the device contains an ARM Cortex-A53 quad-core CPU and an ARM Mali-400 MP2 graphics processing unit (GPU). In addition, one embodiment of the system 100 integrates a Deephi DNN co-processor into the FPGA fabric to emulate a neural network accelerator. Finally, the entire system is provisioned with 4 GB LPDDR4 DRAM in the processing subsystem, which is partially leveraged for frame buffer capacity. The fully functional pipeline delivers real-time performance of up to 60 fps for video pass-through and up to 30 fps for certain vision tasks, such as face detection. One embodiment of the system 100 was built around Xilinx's reVISION platform, which implements an end-to-end video pipeline with major components shown in Table 2.

Encoder and Decoder One embodiment of the encoder 120 is implemented with Vivado HLS as a fully-streaming block with AXI-stream interfaces. In the encoder 120, input/output buffers are FIFO structures with a depth of 16.

It was found that this depth is enough to meet the 2 pixel-per-clock performance to match ISP performance and to avoid any pipeline stalls.

One embodiment of the decoder 140 is implemented with Vivado HLS, utilizing AXI memory-mapped interfaces on the input and output for integration with controllers and processing units. The decoder 140 operates within the timing budget without introducing extra latency. Both encoder 120 and decoder 140 functionally work in HLS simulations and the entire video pipeline passes Vivado FPGA post-layout timing. In addition to a hardware-based implementation of the decoder 140, a software-based implementation of the decoder 140 was designed and included using C++ and OpenCV. The software-based implementation of the decoder 140 runs in real-time for a 1080p video stream.

As Xilinx packages the system DDR controller as a part of its Zynq CPU IP module, for that particular embodiment the decoder 140 could not be integrated between the DDR controller and the xPU as shown in FIG. 4. Instead, the decoder 140 was implemented as a memory-mapped peripheral slave to Zynq SoC. In this integration, the system passes the pointers to the encoded frame 220 and encoding metadata 230 to the decoder 140 to reconstruct the original frame.

5.2 Runtime

Runtime of the system 100 can include a standard software stack with a user-space API, a kernel-space driver, and a set of low-level physical registers. Encoding region parameters are then implemented as registers in the encoder 120/decoder 140 modules inside the SoC. Upon invoking any setter function from the application, the user-space API passes parameters to the kernel-space driver. The driver then writes these parameters to the appropriate registers in the hardware units over an AXI-lite interface.

5.3 Workloads

Three widely-used vision tasks are studied: (i) Visual SLAM, determining camera position with respect to its surroundings while constructing the map of surroundings. (ii) Human pose estimation, tracking person movement. (iii) Face detection, tracking faces over time. For each task, as shown in Table 3, state-of-the-art algorithms are selected with different input, memory, and computational requirements.

Notably, real-time performance of the V-SLAM workload is not attainable on the FPGA's CPU due to the compute-intensive nature of ORB-SLAM2. Therefore, the evaluation resorts to a simulation-based approach where the V-SLAM workload is run on a desktop computer, the encoding region labels are generated, and fed to the encoder 120. That said, there are commercial V-SLAM IP cores available in the market that offer real-time performance.

Benchmarks: Popular publicly available benchmarks are used for each of these tasks to evaluate their accuracy. Each of these datasets comprise videos with different visual attributes, including illumination variation and occlusion that mimic the real-time scenarios in the wild. In addition, these videos cover a wide range of settings, e.g., indoor/outdoor, crowded/dispersed, and fast/slow motion of objects making them realistic candidates for evaluating rhythmic pixel encoding regions.

To evaluate the potential of rhythmic pixel encoding regions on high-precision visual computing, visual SLAM is evaluated on a 4K dataset. Since there are no ready-made 4K datasets available for visual SLAM, a dataset of 6000 frames was created spanning a total of 7 indoor video sequences with varying user movement. For portability, the 4K camera on a Microsoft Azure Kinect DK is used. An HTC Vive tracker setup is used to obtain the ground truth pose. The obtained ground truth pose has an offset compared to the original pose since the tracker is at a different location from the camera. The information from Kinect's IMU sensor is used to correct the offset.

For human pose estimation, PoseTrack is used with 3792 frames across all video sequences. Finally, for face detection, the ChokePoint dataset is used which comprise 20 video sequences and 22,099 face images.

Baselines: The workloads were tested against the following baselines. (a) Frame-based computing: frames are captured at high resolution (FCH: 4K for V-SLAM) or low resolution (FCL: 1080p for V-SLAM) (b) Rhythmic pixel encoding regions (RPx): The system implements rhythmic pixel encoding regions of cycle length "x" (c) Multi-ROI cameras: off-the-shelf multi-ROI cameras are also simulated (d) H.264: H.264 video compression is applied with the "Baseline" profile and the "5.2 (2160p60)" level for the codec.

As far as can be seen, commercial multi-ROI cameras at this time usually only support up to 16 encoding regions, likely due to architectural un-scalability. For workloads that use more encoding regions, smaller encoding regions are combined into 16 larger encoding regions through k-means clustering. To accurately represent the capabilities of multi-ROI cameras, stride or skip adaptations are not implemented. As an H.264 compression implementation is inaccessible on an FPGA board, a codec datasheet is instead used to form estimations. As compression needs multiple frames to be stored in the memory, the pixel memory footprint and throughput scale accordingly.

5.3.1 Metrics

Task Accuracy: Standard accuracy metrics are selected from computer vision literature for all tasks. For visual SLAM, absolute trajectory error and relative pose error metrics are used as discussed in § 3.4. For human pose estimation/face detection, intersection over union (IoU) score is used as the metric. IoU measures the amount of overlap between the predicted and ground truth bounding boxes. A detection is a true positive (TP) if the IoU score is greater than a certain threshold; otherwise, it is considered as a false positive (FP). Final detection accuracy is the number of true positives among all detections, i.e., TP/(TP+FP), across all the frames, which is known as mean average precision (mAP).

Datarate and Memory Footprint: A throughput simulator is built which takes the encoding region label specification per frame from the application and uses it to generate the memory access patterns of pixel traffic. The simulator counts the number of pixel transactions and directly reports the read/write pixel throughput in bytes/sec. For memory footprint, the size of encoded frame buffers are measured over time.

Overhead: Xilinx Vivado is used to determine the area and power overhead of the encoder 120 and decoder 140 involved with the system 100. The resource utilization from the post-layout design is used as a proxy to report the area overhead; For power overhead, the numbers from Vivado power analysis tool are used.

5.3.2 Policy/Parameter Choices

Encoding region selection: As outlined in § 4.3, feature characteristics are used to guide the selection of encoding region labels to evaluate tasks. For V-SLAM, encoding region size is derived directly from the feature size attribute, while spatial and temporal resolutions are derived from the octave attribute and feature displacement respectively. Face trajectory is used for face detection and skeletal pose joints are used for human pose estimation for determining the encoding regions. Spatial and temporal resolutions are calculated based on the encoding region's size and motion, respectively.

Cycle length: The effectiveness of the example cycle-based policy with cycle lengths of CL=5, 10, and 15 are evaluated.

TABLE 4

Observed statistics of task and benchmark

| Task | Avg. # of Encoding Regions | Encoding Region Size | Stride | Rate |
|---|---|---|---|---|
| Visual SLAM | 973 | Min: 70 × 70 Max: 230 × 230 | Min: 1 Max: 4 | Min: 100 ms Max: 33 ms |
| Face Detection | 3 | Min: 70 × 63 Max: 270 × 28 | Min: 1 Max: 2 | Min: 67 ms Max: 33 ms |
| Human Pose Estimation | 4 | Min: 161 × 248 Max: 324 × 512 | Min: 2 Max: 4 | Min: 100 ms Max: 33 ms |

TABLE 5

Resource utilization for different encoder designs

| Type | # Encoding Regions | # LUTs | # FFs | # BRAMs |
|---|---|---|---|---|
| Parallel | 100 | 4644 | 5935 | 6 |
| Parallel | 200 | 8635 | 10935 | 6 |
| Parallel | 400 | 16251 | 20685 | 6 |
| Parallel | 1600 | No Synth | No Synth | No Synth |
| Hybrid | 100 | 942 | 1189 | 11 |
| Hybrid | 200 | 949 | 1190 | 11 |
| Hybrid | 400 | 944 | 1191 | 11 |
| Hybrid | 1600 | 952 | 1186 | 11 |

6. Evaluation

6.1 The Use of Rhythmic Pixel Encoding Regions is Flexible

Runtime successfully allows apps to express encoding region labels without any restrictions on the number, size, and resolution of the encoding regions, as shown in Table 4. The sizes of these encoding regions vary based on the semantics, e.g., nearness/farness of a face with respect to the camera. These encoding regions are also sampled at different spatio-temporal resolutions based on their content.

Algorithms/Apps are still reliable: With flexible encoding region specification, the app now deals with only the pixels within the encoding regions as opposed to the pixels in the entire frame. As shown in FIGS. 9A-9E, it was found that apps can still reliably perform their tasks with a slight accuracy loss compared to frame-based computing at high resolutions on uncompressed (FCH) or compressed (H.264) frames. Comparatively, frame-based computing at low resolutions (FCL) performs poorly, with significantly raised errors for all of the visual workloads.

A trade-off was observed between cycle length and accuracy. As shown in 9A-9E, while higher cycle lengths help discard more pixels, they also take a toll on the task accuracy. Moderate cycle lengths, e.g., CL=10, strike a reasonable balance between energy savings and task accuracy. In V-SLAM, high standard deviation is observed. This indicates future opportunity to adaptively reduce cycle length to improve accuracy for scenes with high motion.

This raises a question: How much accuracy loss is acceptable? There is no set standard in the vision community, as it depends on the app context. To that end, the flexibility of policy choice allows developers to heuristically set accuracy expectations for their specific apps. Evaluated workloads result in roughly 5% accuracy loss for moderate cycle lengths, i.e., CL=10. Future investigation into encoding region selection policies and adapted algorithms could further improve accuracy.

A higher standard deviation is also observed for raised cycle lengths, especially for V-SLAM. This indicates scene-based variability in accuracy loss. The scenes were analyzed to find that the scenes reporting low accuracy loss are fairly static in nature, whereas the scenes with high accuracy loss have rapid scene motion. Other scenes in the benchmark resulted in an average accuracy loss. Ideally, in future integrations, this information could be leveraged, e.g., using accelerometer data and/or scene knowledge to guide the encoding region selection policy.

6.2 The Use of Rhythmic Pixel Encoding Regions is Memory-Friendly

Discarding pixels relieves memory interfaces: Rhythmic pixel encoding regions substantially reduce the data traffic across DDR interfaces, as shown in FIGS. 8A-8C. With higher cycle lengths, the system discards more pixels, leading to further reduction in memory bandwidth. Specifically, it was found that memory traffic decreases by 5-10% with every 5-step increase in cycle length.

Notably, it was found that the work saving techniques such as search-space reduction in the encoder 120 works for a broad spectrum of videos. Evaluated datasets, which include different videos captured in the wild, can include images with encoding regions spread across the entire image as well as images with encoding regions confined to a few areas within the image. The encoder 120 saves work in both cases. In the former case, the encoder 120 saves work by reducing the number of encoding region comparisons for each row. In the latter case, the encoder 120 saves work by skipping encoding region comparison entirely for those rows where there are no encoding regions.

The pixel memory throughput for the multi-ROI baseline is larger than that of rhythmic pixel encoding regions for face detection and pose estimation workloads and substantially higher for visual SLAM. Video compression generates a substantially higher amount of memory traffic since it operates on multiple frames.

Discarding pixels reduces memory footprint: Rhythmic pixel encoding regions not only relieve the memory interfaces but also helps reduce the pixel memory footprint of the vision pipeline, with similar trends, also shown in FIGS. 8A-8C. Specifically, with the system 100, the average frame buffer size reduces by roughly 50% compared to frame-based computing. Frame buffers are storage intensive components in the vision pipeline; with smaller frame buffers, a system can not only reduce storage energy, but also potentially afford to store buffers locally inside the SoC itself, thereby reducing reliance on DRAM. Metadata produced by the encoder 120 incurs minimal memory overhead. Specifically, EncMask and row offsets amount to 8% of pixel buffer storage for a 1080p frame.

As such, rhythmic pixel encoding regions reduce pixel memory traffic by generating sparser pixel streams and reduces the memory footprint by generating smaller frame buffers. The reduction is more with higher cycle lengths Energy efficiency implications of rhythmic pixel encoding regions: Memory efficiency begets energy efficiency; as is widely acknowledged in the computer architecture community, systems expend significant energy to move data in and out of memory. Based on first order modeling, with an assumption of 300 pJ to read a pixel and 400 pJ to write a pixel, the reduced interface traffic of rhythmic pixel encoding regions reduces energy consumption by 18 mJ per frame for RP10 on V-SLAM at 4K and 30 fps. This reduces power consumption by 550 mW. The precise energy savings will depend on system characteristics that are highly specific to the device, operating system, and application usage pattern. The coarse model was leveraged to contextualize the benefits of reducing pixel memory throughput.

Further energy reduction could result from deeper investigation in tuning vision algorithms and architectures to reduce their computational workload on lower resolution workloads, e.g., avoiding computation on zeroed pixels. Power reduction through sparse computing has been shown to be effective strategy, which is a focus of future work.

6.3 The Hardware Extensions are Lightweight and Scalable

Since real-estate is a precious resource on the SoC, hardware extensions need to be lightweight and scalable to support a multitude of encoding regions without taking too many resources.

Encoder scales well with number of encoding regions: As shown in Table 5, the encoder 120 is operable to support additional encoding regions without needing significantly more transistors. This is because the encoder 120 utilizes a hybrid architecture that uses the processor for pre-sorting at the OS level and specialized architecture for shortlisting encoding regions. This significantly reduces the number of comparisons needed, thereby favoring scalability. On the other hand, resource footprint for a fully parallel based implementation of the encoder 120 substantially increases with more encoding regions to such an extent that they cause synthesis issues on the FPGA.

Decoder is agnostic to number of encoding regions: As the decoder 140 uses bitmasks (EncMask) instead of encoding region labels, the decoder 140 is agnostic to the number of encoding regions. Specifically, it needs 699 LUTS, 1082 FFs, and 2 BRAMs (18 Kb) for 1080p decoding, regardless of the number of supported encoding regions.

Encoder/decoder are performant: Encoder 120 and decoder 140 designs do not affect the pipeline performance. The present end-to-end system with encoder 120 and decoder 140 runs in real-time; the encoder 120 meets the 2 PPC constraint of the capture pipeline. For the decoder 140, since it intercepts every pixel transaction and appropriately modifies the transaction response, it will add a few clock cycles of delay when returning the response. It was found that this delay is the order of a few 10 s of ns and is negligible compared to the frame compute time—typically 10 s of ms—of vision workloads.

The alternative software-based implementation of the decoder 140 also runs in real time, consuming a few ms of CPU time for a 1080 p frame where 30% of the pixels are regional pixels. The software-based implementation of the decoder 140 linearly scales in time to the amount of regional pixels.

Encoder/decoder are power-efficient: The hardware extensions need to be power-efficient so as not to outweigh potential energy savings. The encoder 120 consumes 45 mW for supporting 1600 encoding regions, which entails less than 7% of standard mobile ISP chip power (650 mW). The decoder 140 consumes <1 mW of power. These power consumption estimates are based off of FPGA targets; power-efficiency improves for ASIC targets.

7. Possible Modifications

DRAM-less Computing: The paradigm of rhythmic pixel encoding regions significantly reduces the average size of the frame buffer.

This presents an opportunity to store frame buffers in the local SoC memory when not dealing with full frame captures. By doing so, the system would be less dependent on DRAM, thereby significantly reducing data movement. An integrated memory-compute system and its effectiveness in reducing memory datarate may be implemented using the principles outlined herein.

Rhythmic Pixel Camera: In some implementations, the encoder 120 can be placed after the camera capture inside the SoC. However, the MIPI which sends the pixels from camera to SoC is still burdened with data movement. To this end, an integration of the encoder 120 inside the camera module to reduce MIPI traffic can be explored for further energy savings.

Pixel Encoding region Selection Policies: Potential policy tradeoffs of rhythmic pixel encoding regions will be further explored. Motion estimation techniques will be explored in guiding the encoding region label selection. Machine learning, e.g., reinforcement learning, could also autonomously guide encoding region selection. It is believed that these will unlock the potential of rhythmic pixel encoding regions for high-precision visual computing with efficient memory use.

8. More Information

Frame-based computing is limited by fixed resolutions and frame rates. The present disclosure describes an architecture to sample encoding regions with different spatiotemporal rhythms, and a runtime to allow encoding region selection control. Encoding regions are efficiently encoded before being written to memory. Compact data is decoded on-the-fly before being fed to the vision apps for seamless use. This relieves interface traffic and memory footprint, towards system energy-efficiency. With hardware/software interfaces described herein, early steps are taken to transform the norm of imaging/vision trends towards precise, performant, and efficient vision for AR/VR systems.

8.1 Rhythmic Pixel Encoding Regions in Action

In FIGS. 10A-15G, the progression of frames is shown for different workloads in action. FIGS. 10A-10G show one set of results for implementing Visual SLAM (Benchmark: TUM freiburg1-xyz) across a plurality of frames. FIGS. 11A-11G show another set of results for implementing Visual SLAM (Benchmark: TUM freiburg1-floor) across a plurality of frames. FIGS. 12A-12G show another set of results for implementing Visual SLAM (Benchmark: TUM freiburg2-360-kidnap-secret) across a plurality of frames. FIGS. 13A-13G show results for implementing human pose estimation (Benchmark: PoseTrack 2017 024575-mpii) across a plurality of frames. FIGS. 14A-14G show results for implementing human pose estimation (Benchmark: PoseTrack 2017 015301-mpii) across a plurality of frames. FIGS. 15A-15G show results for implementing face detection (Benchmark: Chokepoint dataset P2E-S5) across a plurality of frames.

8.2 Energy Model

The power measurements directly taken off from the Xilinx Zynq FPGA board, which consumes power on the order of tens of watts, are not representative of mobile systems, which consume only a few watts of power for typical vision tasks. Therefore, a coarse energy model is constructed based on reported numbers in component datasheets and computer architecture literature to estimate system power. Precise energy savings will depend on system characteristics that are highly specific to the device, operating system, and application usage pattern. The first-order linear model is constructed to approximate power consumption to contextualize the benefits of reducing pixel memory throughput in a mobile system.

TABLE 6

Energy-per-pixel of various components in the vision pipeline. As is widely acknowledged, communication cost is at least three orders of magnitude more than compute cost.

| Component | Energy (pJ/pixel) |
| --- | --- |
| Sensing | 595 |
| Communication (SoC-DRAM) | 2800 |
| Storage | 677 |
| Computation (per MAC) | 4.6 |

In particular, the system energy is broken down into four components: sensing, computation, storage, and communication, as shown in Table 6. Sensing requires an energy of roughly 600 pJ/pixel, mostly drawn from three components: pixel array, read-out circuits, and analog signal chain. DRAM storage on standard mobile-class memory chips (8 Gb, 32-bit LPDDR4) draws 677 pJ/pixel for writing and reading a pixel value. This roughly divides into 300 pJ/pixel for reading and 400 pJ/pixel for writing. Communication over DDR interfaces incur 4 nJ/pixel, mostly due to operational amplifiers on transmitters and receivers. The interface power dissipation is measured on 4-lane CSI interfaces and LPDDR4 interfaces by inputting several datarates. From this information, a linear-regression model is constructed to estimate the energy per pixel to be 1 nJ/pixel over CSI and 3 nJ/pixel over DDR. 5 pJ per MAC operation are used to estimate compute energy.

FPGA measurements of pixel memory read/write throughput and computation patterns are used to apply the runtime behavior of the system to the energy model of the system 100. For communication and storage, memory traffic/footprint values are taken from FIG. 7 and applied to the model. Sensing energy is obtained by applying frame resolution from Table 3 on the present model. For compute energy, the number of MAC operations for CNN workloads is taken and applied to the model.

9. Computer-Implemented Device

Figure 16:
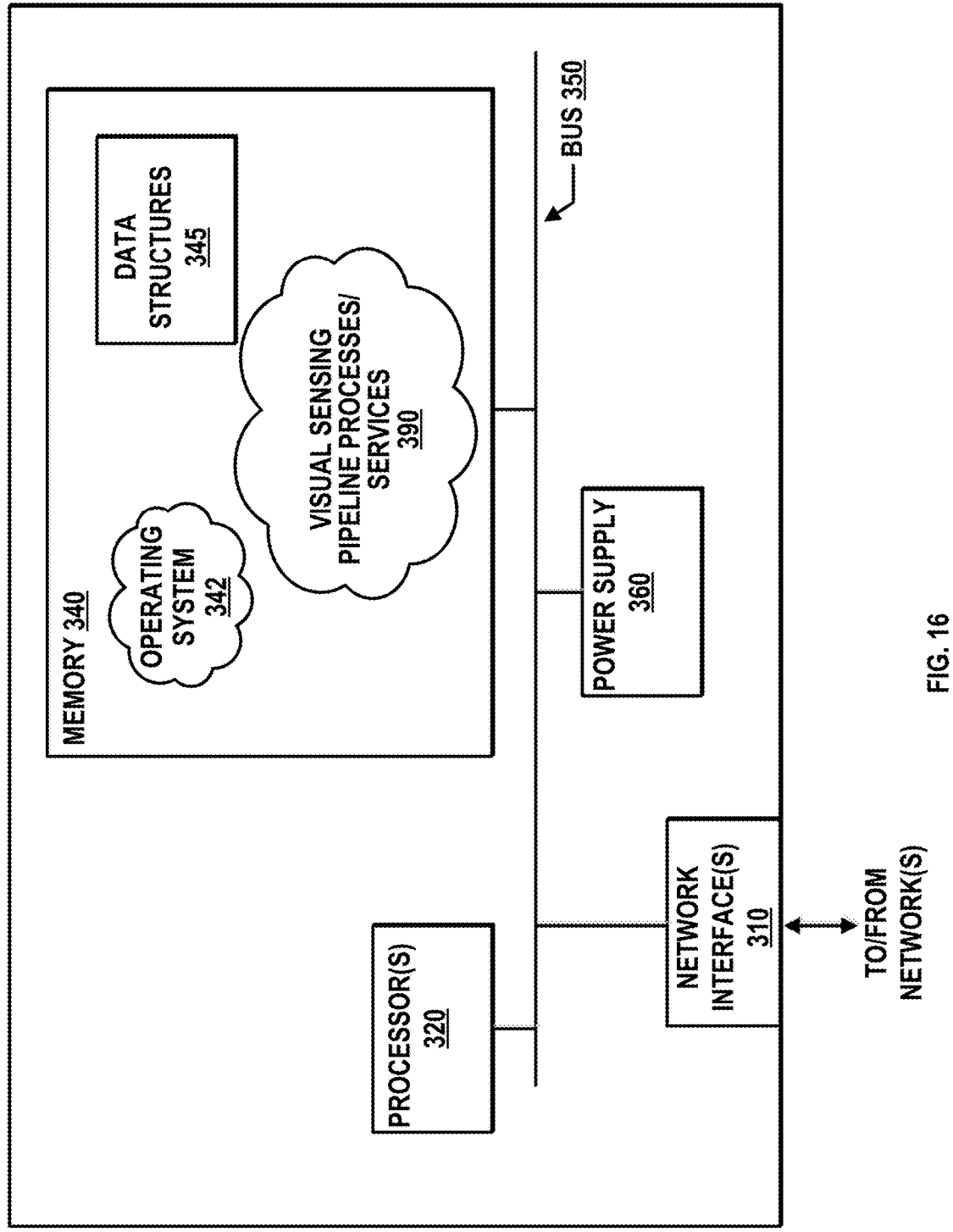
FIG. 16 is a simplified diagram showing an example computing device for implementation of the system of FIGS. 2A, 2B, and 4-6.

FIG. 16 is a schematic block diagram of an example device 300 that may be used with one or more embodiments described herein, e.g., as a component of system 100 shown in FIGS. 2A, 2B, and 4, including encoder 120 shown in FIG. 5 and decoder 140 shown in FIG. 6.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may include visual sensing pipeline processes/services 390 described herein, which can include a set of instructions executable by the processor 320 to perform aspects of the functionalities discussed above with reference to FIGS. 2A, 2B, and 4-6, as well as method 400 further discussed herein with reference to FIGS. 17A-17D. Note that while visual sensing pipeline processes/services 390 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the visual sensing pipeline processes/services processes/services 390 is shown as a standalone process, those skilled in the art will appreciate that this process may be executed as a routine or module within other processes.

10. Methods

FIGS. 17A-17D show a method 400 for encoding and decoding a frame as implemented by the system 100 outlined herein with respect to FIGS. 2A, 2B and 4-6. For instance, method 400 can be implemented at device 300 as part of visual sensing pipeline processes/services processes/services 390.

Figure 17A:
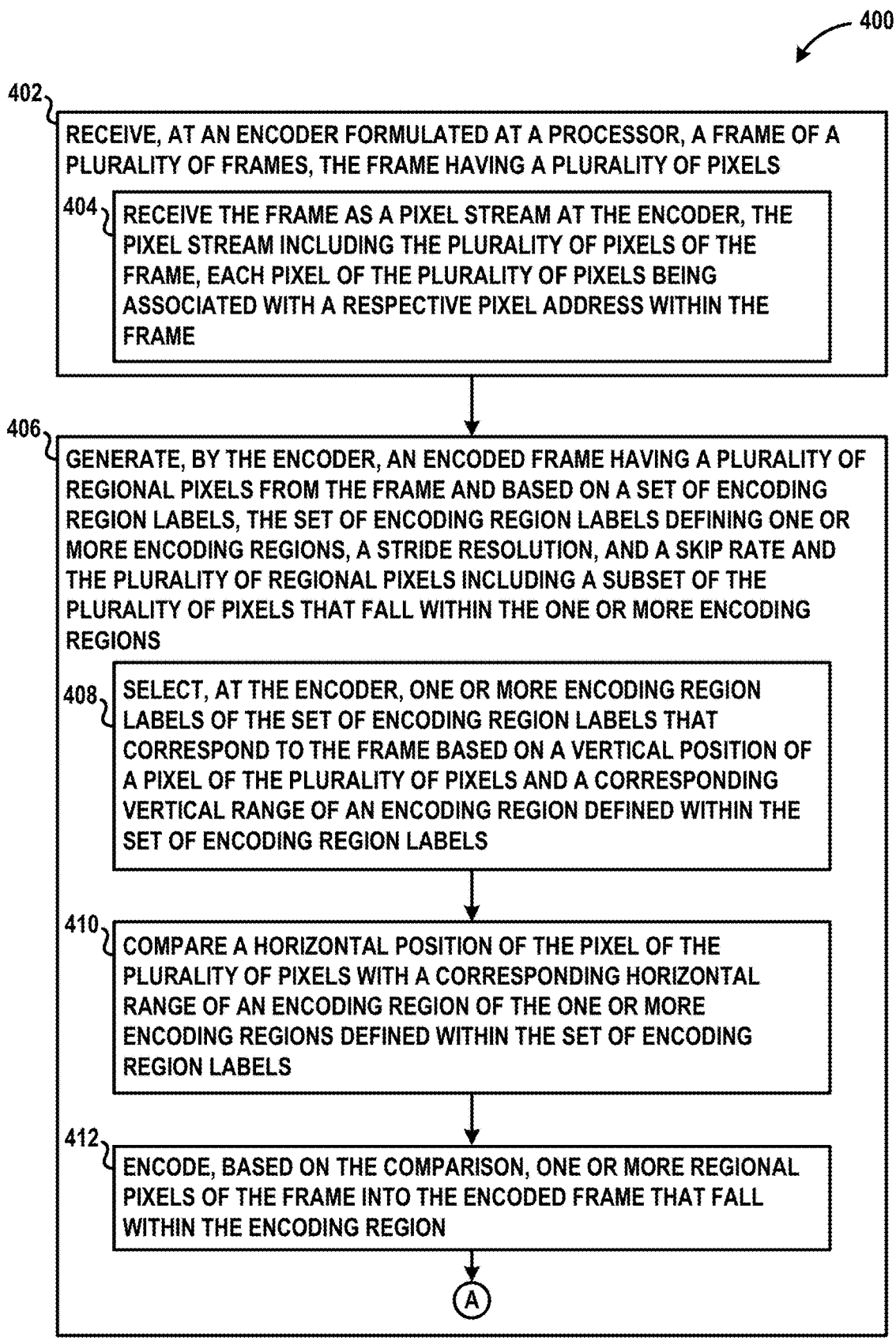

With reference to FIG. 17A, step 402 of method 400 includes receiving, at an encoder formulated at a processor, a frame of a plurality of frames, the frame having a plurality of pixels. Step 402 can include a step 404 of method 400, which includes receiving the frame as a pixel stream at the encoder (e.g., at a sampler of the encoder), the pixel stream including the plurality of pixels of the frame, each pixel of the plurality of pixels being associated with a respective pixel address within the frame.

Step 406 of method 400 follows step 402 and includes generating, by the encoder, an encoded frame having a plurality of regional pixels from the frame and based on a set of encoding region labels, the set of encoding region labels defining one or more encoding regions, a stride resolution, and a skip rate and the plurality of regional pixels including a subset of the plurality of pixels that fall within the one or more encoding regions. Step 406 can include various sub-steps, including step 408 of method 400 that includes selecting, at the encoder (e.g., at an ROI selector of the encoder), one or more encoding region labels of the set of encoding region labels that correspond to the frame based on a vertical position of a pixel of the plurality of pixels and a corresponding vertical range of an encoding region defined within the set of encoding region labels. Step 410 of method 400 follows step 408 as a sub-step of step 406, and includes comparing a horizontal position (e.g., x-index) of the pixel of the plurality of pixels with a corresponding horizontal range (e.g., x-range or "row") of an encoding region of the one or more encoding regions defined within the set of encoding region labels. Step 412 of method 400 follows step 410 as a sub-step of step 406, and includes encoding, based on the comparison, one or more regional pixels of the frame into the encoded frame that fall within the encoding region. FIG. 17A concludes at circle A within step 406.

Continuing at circle A of FIG. 17B, step 406 further includes step 414 of method 400, which includes omitting, based on the comparison, one or more non-regional pixels of the frame that do not fall within the encoding region from the encoded frame. Step 416 of method 400 is also a sub-step of step 406, and includes omitting, based on the comparison, one or more strided pixels of the frame from the encoded frame based on the stride resolution defined within the set of encoding region labels. Finally, step 418 of method 400 is also a sub-step of step 406, and includes omitting, based on the comparison, one or more skipped pixels of the frame from the encoded frame based on the skip rate defined within the set of encoding region labels.

Step 420 of method 400 follows step 406, and includes writing the encoded frame to a memory (e.g., DRAM) preserving raster-scan order. Step 422 of method 400 follows step 420 and includes writing a set of encoding metadata associated with the encoded frame to the memory, the set of encoding metadata including an encoding mask and a per-row offset.

Step 424 of method 400 is a sub-step of step 422, and includes generating, based on the comparison, the encoding mask indicating positions of the one or more regional pixels, the one or more skipped pixels, the one or more strided pixels, and the one or more non-regional pixels. Step 426 of method 400 is also a sub-step of step 422, and includes incrementing, for each regional pixel within a row of the encoded frame, the per-row offset indicative of a total quantity of regional pixels within the row. Step 422 and FIG. 17B conclude at circle B.

Figure 17C:
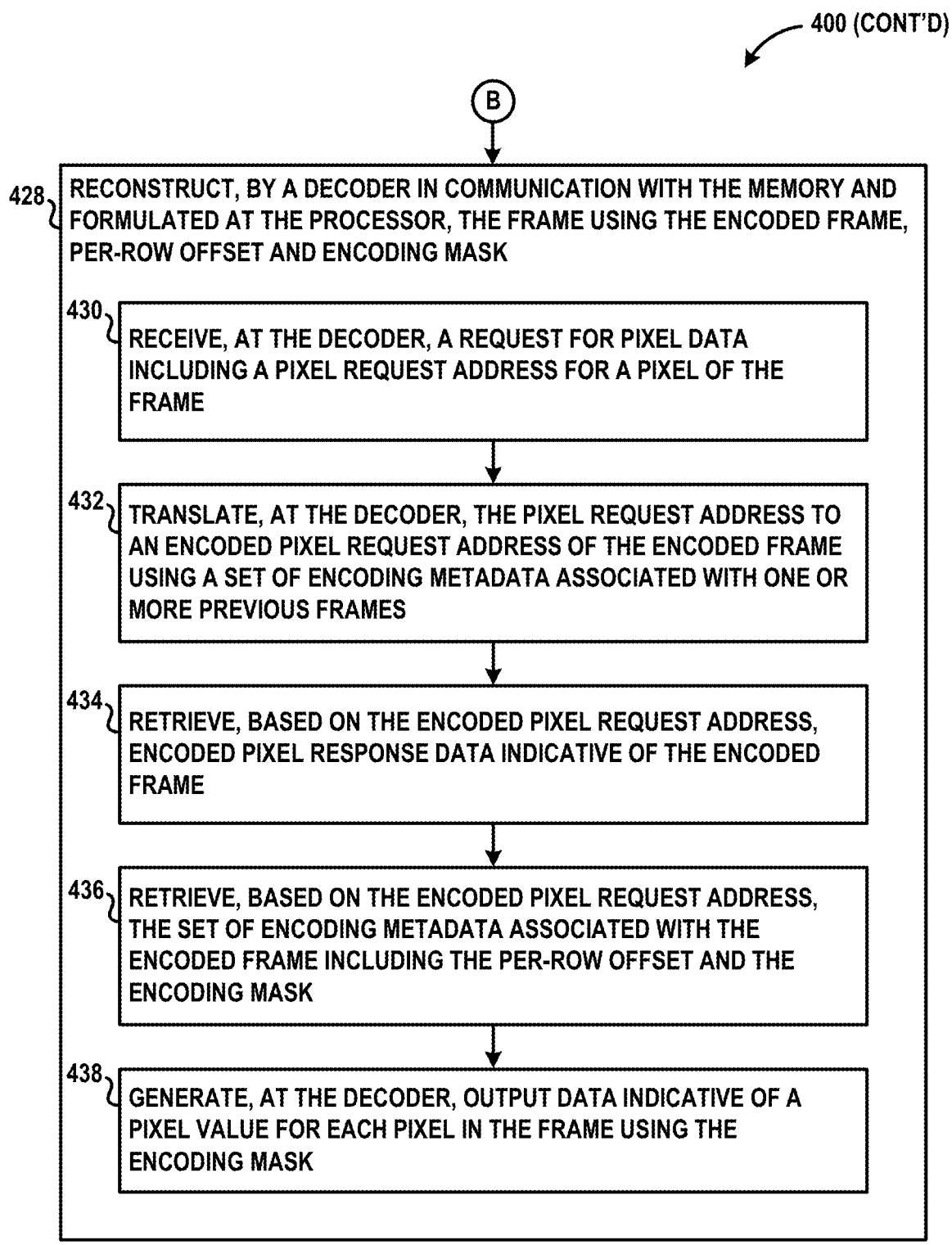

Continuing at circle B of FIG. 17C, step 428 of method 400 includes reconstructing, by a decoder in communication with the memory and formulated at the processor, the frame using the encoded frame, per-row offset and encoding mask. Step 428 includes several sub-steps, including step 430 of method 400, which includes receiving, at the decoder, a request for pixel data including a pixel request address for a pixel of the frame. Step 432 of method 400 follows step 430 and includes translating, at the decoder, the pixel request address to an encoded pixel request address of the encoded frame using a set of encoding metadata associated with one or more previous frames. Step 434 of method 400 follows step 432 and includes retrieving, based on the encoded pixel request address, encoded pixel response data indicative of the encoded frame. Step 436 of method 400 follows step 434 and includes retrieving, based on the encoded pixel request address, the set of encoding metadata associated with the encoded frame including the per-row offset and the encoding mask. Step 438 of method 400 follows step 436 and includes generating, at the decoder, output data indicative of a pixel value for each pixel in the frame using the encoding mask. Step 438 can include various sub-steps elaborated on in FIG. 17D.

Figure 17D:
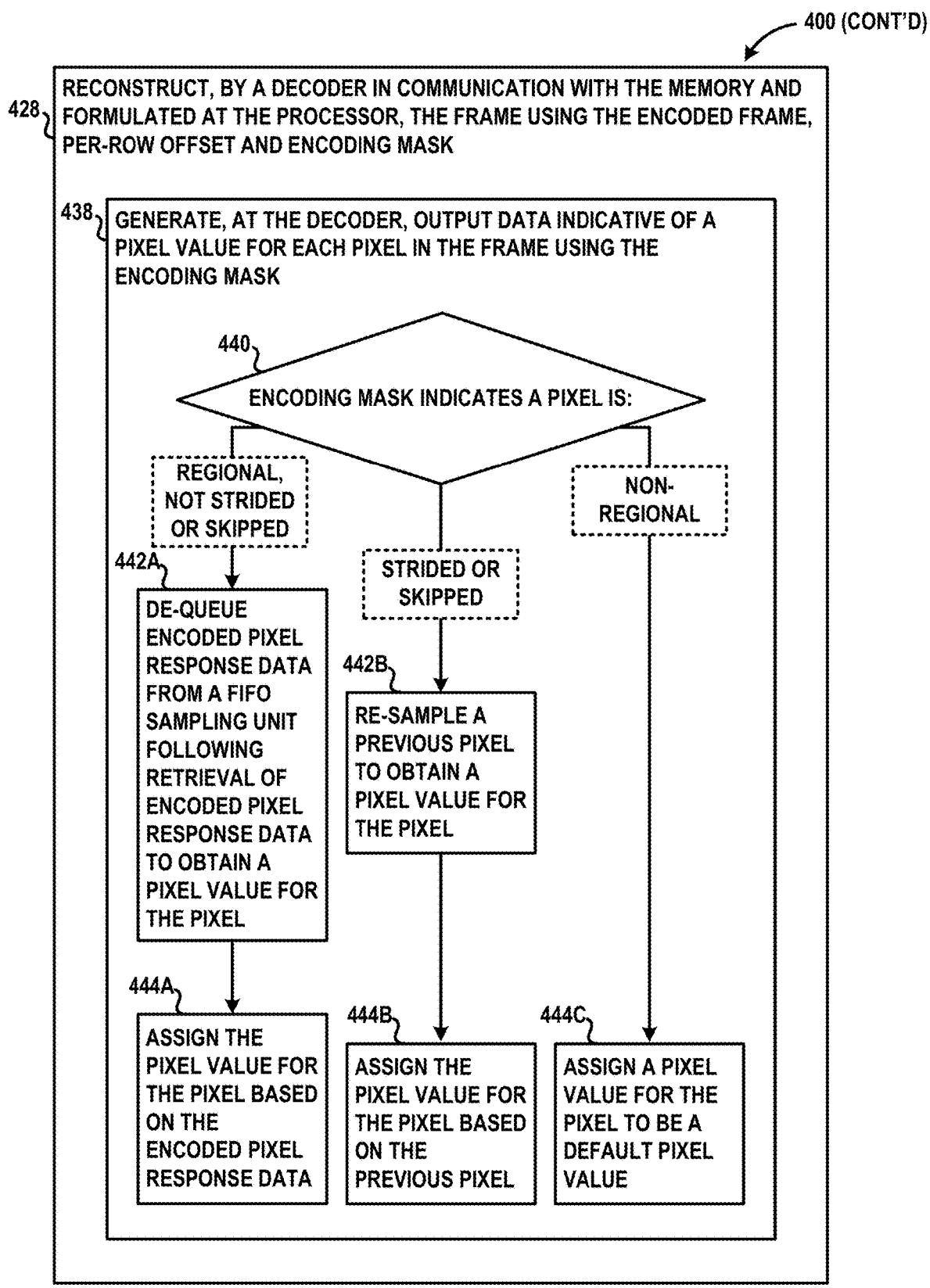

FIG. 17D includes sub-steps of step 438, which can be a sub-step of step 428 as shown. At step 440, the system determines, for a pixel and based on the encoding mask, whether the pixel falls into one of three categories: i) regional and not strided or skipped, ii) strided or skipped, and iii) non-regional.

For pixels falling into the first category (i.e., regional and not strided or skipped), step 442A of method 400 includes de-queueing encoded pixel response data from a first-in, first-out (FIFO) sampling unit following retrieval of encoded pixel response data to obtain a pixel value for the pixel. Step 444A of method 400 follows step 442A and includes assigning the pixel value for the pixel based on the encoded pixel response data.

For pixels falling into the second category (i.e., strided or skipped), step 442B of method 400 includes re-sampling a previous pixel to obtain a pixel value for the pixel. Step 444B of method 400 follows step 442B and includes assigning the pixel value for the pixel based on the previous pixel.

For pixels falling into the third category (i.e., non-regional), step 444C of method 400 includes assigning a pixel value for the pixel to be a default pixel value (e.g., a black pixel or another suitable default value).

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
 a processor in communication with a memory, the memory including instructions, which, when executed, cause the processor to:
  receive, at an encoder formulated at the processor, a frame of a plurality of frames, the frame having a plurality of pixels;
  generate, by the encoder, an encoded frame having a plurality of regional pixels from the frame and based on a set of encoding region labels, the set of encoding region labels defining one or more encoding regions, a stride resolution, and a skip rate and the plurality of regional pixels including a subset of the plurality of pixels that fall within the one or more encoding regions;
  write the encoded frame to the memory preserving raster-scan order; and
  write a set of encoding metadata associated with the encoded frame to the memory, the set of encoding metadata including an encoding mask and a per-row offset,
 wherein the memory includes further instructions to reconstruct, by a decoder, the frame using the encoded frame, per-row offset and encoding mask.

2. The system of claim 1, the memory further including instructions executable by the processor to:
 receive the set of encoding region labels indicative of an encoding region of the one or more encoding regions, including:
  coordinates of a corner of the encoding region;

dimensions of the encoding region;
the stride resolution indicative of a density of pixels of the encoding region to be encoded; and
the skip rate indicative of an interval for consecutive sampling within the encoding region.

3. The system of claim 1, the memory further including instructions executable by the processor to:
receive data indicative of the frame as a pixel stream at the encoder, the pixel stream including the plurality of pixels of the frame, each pixel of the plurality of pixels being associated with a respective pixel address within the frame;
select, at the encoder, one or more encoding region labels of the set of encoding region labels that correspond to the frame based on a vertical position of a pixel of the plurality of pixels and a corresponding vertical range of an encoding region defined within the set of encoding region labels;
compare a horizontal position of the pixel of the plurality of pixels with a corresponding horizontal range of an encoding region defined within the set of encoding region labels; and
encode, based on the comparison, one or more regional pixels of the frame into the encoded frame that fall within the encoding region.

4. The system of claim 3, the memory further including instructions executable by the processor to:
omit, based on the comparison, one or more non-regional pixels of the frame that do not fall within the encoding region from the encoded frame;
omit, based on the comparison, one or more strided pixels of the frame from the encoded frame based on the stride resolution defined within the set of encoding region labels;
omit, based on the comparison, one or more skipped pixels of the frame from the encoded frame based on the skip rate defined within the set of encoding region labels; and
generate, based on the comparison, the encoding mask indicating positions of the one or more regional pixels, the one or more skipped pixels, the one or more strided pixels, and the one or more non-regional pixels.

5. The system of claim 3, the memory further including instructions executable by the processor to:
increment, for each regional pixel within a row of the encoded frame, the per-row offset indicative of a total quantity of regional pixels within the row.

6. The system of claim 1, the memory further including instructions executable by the processor to:
receive, at the decoder, a request for pixel data including a pixel request address for a pixel of the frame;
translate, at the decoder, the pixel request address to an encoded pixel request address of the encoded frame;
retrieve, based on the encoded pixel request address, encoded pixel response data indicative of the encoded frame;
retrieve, based on the encoded pixel request address, the set of encoding metadata associated with the encoded frame including the per-row offset and the encoding mask; and
generate, at the decoder, output data indicative of a pixel value for each pixel in the frame using the encoding mask.

7. The system of claim 6, wherein translating the pixel request address to the encoded pixel request address of the encoded frame incorporates a set of encoding metadata associated with one or more previous frames.

8. The system of claim 1, wherein the decoder includes a first-in, first-out (FIFO) sampling unit in communication with a resampling buffer that interpolates pixel data for reconstruction of the frame based on the encoding mask.

9. The system of claim 8, wherein the encoding mask indicates that a pixel of the plurality of pixels of the frame is a regional pixel, and wherein the memory further includes instructions executable by the processor to:
de-queue encoded pixel response data from the FIFO sampling unit following retrieval of encoded pixel response data from the memory to obtain a pixel value for the pixel; and
assign the pixel value for the pixel based on the encoded pixel response data.

10. The system of claim 8, wherein the encoding mask indicates that a pixel of the plurality of pixels of the frame is a strided pixel or a skipped pixel, and wherein the memory further includes instructions executable by the processor to:
re-sample a previous pixel to obtain a pixel value for the pixel; and
assign the pixel value for the pixel based on the previous pixel.

11. The system of claim 8, wherein the encoding mask indicates that a pixel of the plurality of pixels of the frame is a non-regional pixel, and wherein the memory further includes instructions executable by the processor to:
assign a pixel value for the pixel to be a default pixel value.

12. A system, comprising:
a processor in communication with a memory, the memory including instructions, which, when executed, cause the processor to:
receive, at a decoder in communication with the memory and formulated at the processor, a request for pixel data including a pixel request address for a pixel of a frame, the frame being encoded as an encoded frame and being associated with a set of encoding metadata including a per-row offset and an encoding mask;
translate, at the decoder, the pixel request address to an encoded pixel request address of the encoded frame, wherein translating the pixel request address to the encoded pixel request address of the encoded frame incorporates a set of encoding metadata associated with one or more previous frames;
retrieve, based on the encoded pixel request address, encoded pixel response data indicative of the encoded frame;
retrieve, based on the encoded pixel request address, the set of encoding metadata associated with the encoded frame including the per-row offset and the encoding mask; and
reconstruct, by the decoder, the frame using the encoded frame, per-row offset and encoding mask.

13. The system of claim 12, wherein the decoder includes a first-in, first-out (FIFO) sampling unit in communication with a resampling buffer that interpolates pixel data for reconstruction of the frame based on the encoding mask.

14. The system of claim 13, wherein the encoding mask indicates that a pixel of the frame is a regional pixel, and wherein the memory further includes instructions executable by the processor to:
de-queue encoded pixel response data from the FIFO sampling unit following retrieval of encoded pixel response data from the memory to obtain a pixel value for the pixel; and assign the pixel value for the pixel based on the encoded pixel response data.

15. The system of claim 13, wherein the encoding mask indicates that a pixel of the frame is a strided pixel or a skipped pixel, and wherein the memory further includes instructions executable by the processor to:
re-sample a previous pixel to obtain a pixel value for the pixel; and
assign the pixel value for the pixel based on the previous pixel.

16. The system of claim 13, wherein the encoding mask indicates that a pixel of the frame is a non-regional pixel, and wherein the memory further includes instructions executable by the processor to:
assign a pixel value for the pixel to be a default pixel value.

17. A method, comprising:
receiving, at an encoder formulated at a processor, a frame of a plurality of frames, the frame having a plurality of pixels, further including
receiving the frame as a pixel stream at the encoder, the pixel stream including the plurality of pixels of the frame, each pixel of the plurality of pixels being associated with a respective pixel address within the frame;
generating, by the encoder, an encoded frame having a plurality of regional pixels from the frame and based on a set of encoding region labels, the set of encoding region labels defining one or more encoding regions, a stride resolution, and a skip rate and the plurality of regional pixels including a subset of the plurality of pixels that fall within the one or more encoding regions, including
selecting, at the encoder, one or more encoding region labels of the set of encoding region labels that correspond to the frame based on a vertical position of a pixel of the plurality of pixels and a corresponding vertical range of an encoding region defined within the set of encoding region labels;
comparing a horizontal position of the pixel of the plurality of pixels with a corresponding horizontal range of an encoding region of the one or more encoding regions defined within the set of encoding region labels; and
encoding, based on the comparison, one or more regional pixels of the frame into the encoded frame that fall within the encoding region;
writing the encoded frame to a memory preserving raster-scan order; and
writing a set of encoding metadata associated with the encoded frame to the memory, the set of encoding metadata including an encoding mask and a per-row offset.

18. The method of claim 17, further comprising:
omitting, based on the comparison, one or more non-regional pixels of the frame that do not fall within the encoding region from the encoded frame;
omitting, based on the comparison, one or more strided pixels of the frame from the encoded frame based on the stride resolution defined within the set of encoding region labels;
omitting, based on the comparison, one or more skipped pixels of the frame from the encoded frame based on the skip rate defined within the set of encoding region labels; and
generating, based on the comparison, the encoding mask indicating positions of the one or more regional pixels, the one or more skipped pixels, the one or more strided pixels, and the one or more non-regional pixels.

19. The method of claim 17, further comprising:
reconstructing, by a decoder in communication with the memory and formulated at the processor, the frame using the encoded frame, per-row offset and encoding mask.

20. The method of claim 19, further comprising:
receiving, at the decoder, a request for pixel data including a pixel request address for a pixel of the frame;
translating, at the decoder, the pixel request address to an encoded pixel request address of the encoded frame using a set of encoding metadata associated with one or more previous frames;
retrieving, based on the encoded pixel request address, encoded pixel response data indicative of the encoded frame;
retrieving, based on the encoded pixel request address, the set of encoding metadata associated with the encoded frame including the per-row offset and the encoding mask; and
generating, at the decoder, output data indicative of a pixel value for each pixel in the frame using the encoding mask.

21. The method of claim 19, wherein the encoding mask indicates that a pixel of the plurality of pixels of the frame is a regional pixel, the method further comprising:
de-queueing encoded pixel response data from a first-in, first-out (FIFO) sampling unit following retrieval of encoded pixel response data to obtain a pixel value for the pixel; and
assigning the pixel value for the pixel based on the encoded pixel response data.

22. The method of claim 19, wherein the encoding mask indicates that a pixel of the plurality of pixels of the frame is a strided pixel or a skipped pixel, the method further comprising:
re-sampling a previous pixel to obtain a pixel value for the pixel; and
assigning the pixel value for the pixel based on the previous pixel.

23. The method of claim 19, wherein the encoding mask indicates that a pixel of the plurality of pixels of the frame is a non-regional pixel, the method further comprising:
assigning a pixel value for the pixel to be a default pixel value.

24. A method, comprising:
receiving, at an encoder formulated at a processor, a frame of a plurality of frames, the frame having a plurality of pixels;
generating, by the encoder, an encoded frame having a plurality of regional pixels from the frame and based on a set of encoding region labels, the set of encoding region labels defining one or more encoding regions, a stride resolution, and a skip rate and the plurality of regional pixels including a subset of the plurality of pixels that fall within the one or more encoding regions, including
incrementing, for each regional pixel within a row of the encoded frame, the per-row offset indicative of a total quantity of regional pixels within the row
writing the encoded frame to a memory preserving raster-scan order; and
writing a set of encoding metadata associated with the encoded frame to the memory, the set of encoding metadata including an encoding mask and a per-row offset.

* * * * *